US009923926B1

(12) United States Patent
Banga et al.

(10) Patent No.: US 9,923,926 B1
(45) Date of Patent: *Mar. 20, 2018

(54) SEAMLESS MANAGEMENT OF UNTRUSTED DATA USING ISOLATED ENVIRONMENTS

(71) Applicant: Bromium, Inc., Cupertino, CA (US)

(72) Inventors: Gaurav Banga, Cupertino, CA (US); Sergei Vorobiev, Mountain View, CA (US); Deepak Khajuria, San Jose, CA (US); Vikram Kapoor, Cupertino, CA (US); Ian Pratt, Cambridge (GB); Simon Crosby, Kirkland, WA (US)

(73) Assignee: Bromium, Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/864,692

(22) Filed: Sep. 24, 2015

Related U.S. Application Data

(63) Continuation of application No. 13/419,345, filed on Mar. 13, 2012, now Pat. No. 9,148,428.

(51) Int. Cl.
*H04L 29/06* (2006.01)
*G06F 21/00* (2013.01)

(52) U.S. Cl.
CPC ............ *H04L 63/20* (2013.01); *H04L 63/105* (2013.01); *H04L 63/1425* (2013.01); *H04L 67/42* (2013.01)

(58) Field of Classification Search
CPC ....... H04L 63/20; H04L 63/105; H04L 67/42; H04L 63/1425
See application file for complete search history.

(56) References Cited

U.S. PATENT DOCUMENTS 5,778,173 A * 7/1998 Apte ...................... G06Q 20/02
705/75
6,108,799 A * 8/2000 Boulay ................. G06F 21/564
714/26
(Continued)

FOREIGN PATENT DOCUMENTS

WO 2008073618 A2 6/2008

OTHER PUBLICATIONS

Zhang et al., "XenSocket: A High-Throughput Interdomain Transport for Virtual Machines", IBM T.J Watson research center, 2007, pp. 184-203.
(Continued)

*Primary Examiner* — Lisa Lewis
(74) *Attorney, Agent, or Firm* — Brokaw Patent Law PC; Christopher J. Brokaw

(57) ABSTRACT

Approaches for managing potentially malicious files using one or more isolated environments. In response to receiving a request to perform an action on a file, a client applies a policy to determine whether the action is deemed trustworthy. The client identifies, without human intervention, an isolated environment, executing or to be executed on the client, in which the action is to be performed based on whether the action is deemed trustworthy. In this way, embodiments allow a user to make use of data deemed untrusted in certain cases without allowing the untrusted data from having unfettered access to the resources of the client. If the requested action is performed in a different isolated environment from which the action was requested, embodiments enable the performance of the action to be performed seamlessly to the user.

31 Claims, 10 Drawing Sheets

(56) References Cited

U.S. PATENT DOCUMENTS

| | | | |
|---|---|---|---|
| 6,789,156 B1 | 9/2004 | Waldspurger | |
| 6,948,044 B1 | 9/2005 | Chandrasekaran | |
| 7,171,523 B2 | 1/2007 | Yamasaki | |
| 7,694,328 B2 | 4/2010 | Joshi et al. | |
| 7,971,047 B1 | 6/2011 | Vlaovic et al. | |
| 7,996,834 B2* | 8/2011 | Araujo, Jr. | G06F 21/53 718/1 |
| 8,060,703 B1 | 11/2011 | Desai et al. | |
| 8,146,084 B1 | 3/2012 | Meketa | |
| 8,151,263 B1 | 4/2012 | Venkitachalam et al. | |
| 8,171,141 B1 | 5/2012 | Offer et al. | |
| 8,219,987 B1 | 7/2012 | Vlaovic et al. | |
| 8,346,727 B1 | 1/2013 | Chester et al. | |
| 8,347,263 B1 | 1/2013 | Offer | |
| 8,387,045 B2 | 2/2013 | Yasutaka et al. | |
| 8,391,494 B1* | 3/2013 | Serenyi | H04L 63/0428 380/278 |
| 8,392,993 B1* | 3/2013 | Oliver | H04L 63/1416 726/23 |
| 8,407,438 B1 | 3/2013 | Ranade | |
| 8,443,188 B2 | 5/2013 | Borde et al. | |
| 8,543,641 B2 | 9/2013 | Cherukuri et al. | |
| 8,601,583 B1 | 12/2013 | Chandrasekhar et al. | |
| 8,639,814 B2 | 1/2014 | Jung et al. | |
| 8,656,386 B1 | 2/2014 | Baimetov et al. | |
| 8,726,337 B1 | 5/2014 | Curry et al. | |
| 8,752,047 B2* | 6/2014 | Banga | G06F 21/53 718/1 |
| 8,776,240 B1* | 7/2014 | Wu | G06F 21/567 726/22 |
| 8,954,487 B2 | 2/2015 | Jung et al. | |
| 9,075,601 B1 | 7/2015 | Hucik et al. | |
| 9,390,263 B2 | 7/2016 | Thomas | |
| 2003/0070089 A1* | 4/2003 | Fu | G06F 8/60 726/4 |
| 2003/0204569 A1* | 10/2003 | Andrews | H04L 51/12 709/206 |
| 2004/0128670 A1 | 7/2004 | Robinson et al. | |
| 2005/0021994 A1* | 1/2005 | Barton | G06F 21/562 726/26 |
| 2005/0086511 A1* | 4/2005 | Balacheff | G06F 21/57 726/34 |
| 2005/0149726 A1 | 7/2005 | Joshi et al. | |
| 2005/0188272 A1* | 8/2005 | Bodorin | G06F 21/566 714/38.1 |
| 2005/0273866 A1* | 12/2005 | Brown | G06F 21/32 726/28 |
| 2006/0101189 A1 | 5/2006 | Chandrasekaran et al. | |
| 2006/0136910 A1* | 6/2006 | Brickell | G06F 21/52 718/1 |
| 2006/0143617 A1 | 6/2006 | Knauerhase et al. | |
| 2006/0184937 A1 | 8/2006 | Abels et al. | |
| 2006/0288343 A1 | 12/2006 | Pallister | |
| 2007/0157307 A1* | 7/2007 | Katoh | H04L 63/105 726/14 |
| 2007/0171921 A1 | 7/2007 | Wookey et al. | |
| 2007/0180450 A1 | 8/2007 | Croft et al. | |
| 2007/0192329 A1* | 8/2007 | Croft | G06F 3/1415 |
| 2007/0198656 A1 | 8/2007 | Mazzaferri et al. | |
| 2007/0300220 A1 | 12/2007 | Seliger et al. | |
| 2008/0001958 A1 | 1/2008 | Vembu et al. | |
| 2008/0059556 A1 | 3/2008 | Greenspan et al. | |
| 2008/0072276 A1 | 3/2008 | Pouliot | |
| 2008/0086779 A1* | 4/2008 | Blake | G06F 21/10 726/27 |
| 2008/0148400 A1* | 6/2008 | Barron | G06F 21/50 726/22 |
| 2008/0209138 A1* | 8/2008 | Sheldon | G06F 21/6218 711/154 |
| 2008/0244028 A1 | 10/2008 | Le et al. | |
| 2008/0244579 A1 | 10/2008 | Muller | |
| 2008/0271017 A1 | 10/2008 | Herington | |
| 2008/0320590 A1* | 12/2008 | Craft | G06F 9/468 726/21 |
| 2009/0007242 A1 | 1/2009 | Subramanian et al. | |
| 2009/0119541 A1 | 5/2009 | Inoue et al. | |
| 2009/0125902 A1 | 5/2009 | Ghosh et al. | |
| 2009/0165133 A1 | 6/2009 | Hwang et al. | |
| 2009/0172660 A1 | 7/2009 | Klotz, Jr. et al. | |
| 2009/0172820 A1 | 7/2009 | Watson | |
| 2009/0222880 A1 | 9/2009 | Mayer et al. | |
| 2009/0249472 A1 | 10/2009 | Litvin et al. | |
| 2009/0260007 A1 | 10/2009 | Beaty et al. | |
| 2009/0276783 A1 | 11/2009 | Johnson et al. | |
| 2009/0300599 A1 | 12/2009 | Piotrowski | |
| 2009/0313620 A1 | 12/2009 | Sedukhin et al. | |
| 2009/0328033 A1 | 12/2009 | Kohavi et al. | |
| 2009/0328221 A1* | 12/2009 | Blumfield | G06F 21/564 726/24 |
| 2010/0058042 A1 | 3/2010 | Locker et al. | |
| 2010/0122343 A1 | 5/2010 | Ghosh et al. | |
| 2010/0235831 A1 | 9/2010 | Dittmer | |
| 2010/0251388 A1* | 9/2010 | Dorfman | G06F 21/36 726/29 |
| 2010/0257523 A1 | 10/2010 | Frank | |
| 2010/0299667 A1 | 11/2010 | Ahmad et al. | |
| 2011/0022694 A1 | 1/2011 | Dalal et al. | |
| 2011/0035494 A1 | 2/2011 | Pandey et al. | |
| 2011/0145926 A1 | 6/2011 | Dalcher et al. | |
| 2011/0173251 A1 | 7/2011 | Sandhu et al. | |
| 2011/0209140 A1 | 8/2011 | Scheidel et al. | |
| 2011/0225582 A1 | 9/2011 | Likura et al. | |
| 2011/0258621 A1 | 10/2011 | Kern | |
| 2011/0296412 A1 | 12/2011 | Banga et al. | |
| 2011/0296487 A1 | 12/2011 | Walsh | |
| 2011/0302577 A1 | 12/2011 | Reuther et al. | |
| 2012/0005672 A1 | 1/2012 | Cervantes et al. | |
| 2012/0089650 A1* | 4/2012 | Gibbs | G06F 17/30073 707/822 |
| 2012/0089666 A1 | 4/2012 | Goswami et al. | |
| 2012/0167204 A1* | 6/2012 | Akka | G06F 21/36 726/22 |
| 2012/0209923 A1 | 8/2012 | Mathur et al. | |
| 2012/0254860 A1 | 10/2012 | Bozek et al. | |
| 2012/0255014 A1* | 10/2012 | Sallam | G06F 21/564 726/24 |
| 2012/0260250 A1 | 10/2012 | Maeda et al. | |
| 2012/0311560 A1 | 12/2012 | Dobrovolskiy et al. | |
| 2013/0024644 A1 | 1/2013 | Givargis et al. | |
| 2013/0055256 A1* | 2/2013 | Banga | G06F 21/53 718/1 |
| 2013/0091570 A1* | 4/2013 | McCorkendale | G06F 21/56 726/23 |
| 2013/0159987 A1 | 6/2013 | Shi et al. | |
| 2013/0288647 A1* | 10/2013 | Turgeman | H04W 12/06 455/411 |
| 2014/0068756 A1* | 3/2014 | Dorfman | G06F 21/36 726/19 |
| 2014/0137110 A1 | 5/2014 | Engle et al. | |
| 2014/0143825 A1* | 5/2014 | Behrendt | G06F 21/552 726/1 |
| 2014/0201525 A1* | 7/2014 | Korthny | G06F 21/6218 713/165 |
| 2014/0258446 A1 | 9/2014 | Bursell | |
| 2014/0351810 A1 | 11/2014 | Pratt et al. | |
| 2016/0337382 A1 | 11/2016 | Thomas | |

OTHER PUBLICATIONS

R. Yavatkar et al., "A Framework for Policy-based Admission Control", Network Working Group, Jan. 2000, RFC 2753, pp. 1-20.

* cited by examiner

SEAMLESS MANAGEMENT OF UNTRUSTED DATA USING ISOLATED ENVIRONMENTS

CLAIM OF PRIORITY

This application is a continuation of, and claims priority to, U.S. non-provisional patent application Ser. No. 13/419,345, filed Mar. 13, 2012, entitled "Seamless Management of Untrusted Data Using Virtual Machines," the contents of which are hereby incorporated by reference for all purposes as if fully set forth herein.

Parent patent application Ser. No. 13/419,345 is a continuation-in-part of, and claims priority to, U.S. non-provisional patent application Ser. No. 13/115,354, now U.S. Pat. No. 8,972,980, filed May 25, 2011, having a priority date of May 28, 2010, entitled "Automated Provisioning of Secure Virtual Execution Environment Using Virtual Machine Templates Based on Requested Activity," the contents of which are hereby incorporated by reference for all purposes as if fully set forth herein.

This application is related to U.S. Pat. No. 8,752,047, issued Jun. 10, 2014, entitled "Automated Management of Virtual Machines to Process Untrusted Data Based on Client Policy Information," the contents of which are hereby incorporated by reference for all purposes as if fully set forth herein.

FIELD OF THE INVENTION

Embodiments of the invention relate to the automated management of untrusted data using isolated environments.

BACKGROUND

Ensuring the security of Internet users and Internet connected devices is one of the grand challenges facing us today. The current state of affairs is very problematic, as our cyber-security infrastructure is easily and routinely subverted by cyber criminals, resulting in great economic loss. Every year brings deeper and more complex dependence by society on our cyber-infrastructure, and yet at the same time the cyber-security problem only worsens as the capabilities of the cyber-criminal mature. In effect, we are building mission-critical dependence into virtually every aspect of human activities on a cyber-infrastructure that is very insecure at its core.

The current state of our cyber-security infrastructure is due, at least in part, to two fundamental limitations. The first limitation is a fundamental mismatch between the design assumptions made by computer security programmers with how the vast majority of users interact with the cyber-infrastructure (the "Security Model Complexity") problem. The second limitation is a lack of appropriate isolation of code and data from trusted and untrusted sources in modern computer systems (the "Lack of Isolation" problem). These two limitations of current systems are somewhat orthogonal, but are both very important for securing a computer system. The "Lack of Isolation" problem, in particular, is very important because modern computer devices, such as a PC or cell phone, are typically general purpose devices that execute a vast wide of software from different sources.

The general purpose capability of modern computing systems is constructed using a layered stack of hardware and software. An example of the layered arrangement of hardware and software that is present in modern computer systems is shown in FIG. 1. At the lowest layer, there is hardware with a small number of basic general purpose programming capabilities. Upon this hardware layer sits the firmware/BIOS which is responsible for, among other things, initializing hardware resources and loading the operating system. The operating system (OS) provides a file system and functionality which may be used by a variety of different applications. On top of the OS layer run the various applications which provide user-visible rich functionality to the computer. The functionality provided by the application layer is typically the primary concern of the computer user.

One advantage and consequence of the layered nature of modern computer systems is that the various layers may come from different vendors, as long as the layers conform to the specifications governing the layer boundary (which may be based on open or proprietary industry standards). To illustrate an example, in a typical PC today the hardware may be constructed around processor and chipset technology provided by Intel or AMD. The firmware/BIOS may be provided by companies like Insyde, AMI or Phoenix Technologies and may be written to conform to several industry specifications such as UEFI and PI. The operating system (OS) may originate from a company like Microsoft or Apple or may be a flavor of the Linux open source OS. Finally, the applications themselves are usually written to the specification of one of the operating systems and may be provided by one of a large multitude of application vendors.

Note that some of the applications may themselves have a layered architecture. A web browser, for example, typically includes a browser core and may also download web applications in the form of HTML, JavaScript, and Flash programs from various Internet web sites. The web browser may run these downloaded web applications locally on top of the browser core. A typical web page contains HTML with embedded JavaScript that can change the HTML being rendered by the web browser dynamically based on user actions without having to re-download the web page from the web server. The HTML may also demarcate part of the web page to be rendered by a plugin, which is typically a separate program that is installed on the computer. Plugins are often downloaded from different sources over the World Wide Web. Thus, a modern computer runs code that comes from a variety of different sources. In particular, application programs may originate from literally millions of different sources once we consider the collection of traditional local applications as well as web applications that are downloaded from websites.

The integrity of a computer system when it runs application code from different sources (or even the same program being run by different users of a shared computer) has traditionally been one of the responsibilities of the OS. The OS uses various hardware and software constructs like virtual memory, processes, and file permissions to prevent code and data belonging to one program (or user) from affecting code and data belonging to another program (or user). This responsibility of the OS to "isolate" programs and data from one another often tends to compete with another responsibility of the OS, which is to allow for co-operation between programs especially between user application programs and system level services such as shared library modules, database services, and other higher-level common OS functionality. These two OS functions, to share and to isolate, require the OS designer to make certain tradeoffs on how much to share and how much to isolate.

As a result of these design tradeoffs, the resulting implementation of modern operating systems has grown to a complexity such that ensuring the OS has no security issues is impractical. In mature operating systems, the security implementation is typically robust enough to work well for normal programs under normal usage with no adverse impact on the operation of the computer. However, most OS implementations are very large and complex bodies of computer code that may not possess a sufficiently robust security system when interacting with programs that are especially designed to take advantage of less-tested or unvalidated corner cases in the operation of the security subsystem.

These "security vulnerabilities" are not important for well-behaved programs during typical operation, but are used extensively by cyber criminals to subvert the computer's security subsystems. Once the system's security is subverted, it is generally possible for cyber criminals to run any software under their control on the subverted computer system.

The Lack of Isolation problem is made worse by the fact that a large amount of code executed by computers today comes from sources outside the computer, some of which have explicit intentions of committing criminal activities. This includes any program downloaded from the Internet or any web site visited by the computer. All downloaded programs (good and bad) have the same OS and library services available to them to use during their operation. Consequently, any program (even malware), can exploit any security vulnerability in the complex OS or web browser environment and subvert the security subsystem that isolates applications from one another. For example, when a user visits a web site, he or she is really running web application code developed by the publisher of the web site. If this web site is malicious, then malware may be executed on the computer. Malware may be designed to exploit a security vulnerability in the web browser to take control of the computer system during subsequent web site visits, e.g., if you visit your bank's web site, your key strokes may be captured and your login/password information for the bank may be transmitted to the malware publisher. Malicious programs may be designed for a variety of purposes, e.g., a malicious program may simply be designed to interfere with the normal operation of a computer rather than extracting useful data from the computer.

While some computer security professionals may understand the existence of the Lack of Isolation problem, this problem is hard to solve in any practical way because preventing applications from working or communicating with each other tends to conflict with achieving the goal of increasing seamless communication between different local and web applications. There has been some work towards the isolation of web code from different sources being run by a web browser. Modern browsers have attempted to create a level of sandboxing around downloaded web application code in order to isolate downloaded code from the rest of the computer and from each other. However, these models are fairly primitive in their ability to deal with the full gamut of security issues that arise during the course of a typical user's web experience. For example, certain versions of Google's Chrome web browser's sandboxing does not address safety issues arising from downloaded browser plugins and various types of native executables; thus, every computer system running certain versions of Chrome is vulnerable to a zero day exploit attack against Adobe Flash or Microsoft Word as much as if the system was running a less secure or older browser with the same Adobe Flash Plug-in or Microsoft Word plug-in.

Web browsers have been burdened with the need to ensure full compatibility to older and non-standard web pages in their efforts to provide superior safety and privacy. For example, web browser programmers have had to make some relaxations in order to correctly render popular web sites that rely on the sharing of information between web sites.

Last but not least, most web browsers vendors suffer from a huge conflict of interest because their business relies upon monetizing the web browsing habits of their users within their own business processes and with their industry partners. This monetization relies on data about users' browsing habits which is contained in the web cookies that are set and later provided to web servers during the course of web sessions. Companies such as Google and Microsoft have a great interest in learning as much as possible about a person's browsing habits and typically arrange the default privacy settings of web browsers to be advantageous to them (but less than optimal from a security and privacy standpoint). This choice of default privacy and core functionality settings causes web browsers to transfer large amounts of sensitive information from end users' machines to Internet related businesses, such as Google, Microsoft, Apple, etc., thereby allowing such businesses to better monetize their customer base by offering appropriate products and services and serving targeted ads. These same settings, however, can be leveraged by malicious parties to exploit security vulnerabilities. While all web browsers provide some level of control to the sophisticated user to tune his or her web browser functionality and/or privacy/safety settings to browse more securely, the vast majority of users never change these default settings.

Some security researchers have also proposed the use of "client virtualization" (also called "Virtualization using a Hypervisor" in the desktop) to solve the Lack of Isolation Problem. In one form of client virtualization, the user runs multiple independent operating systems on their laptop or desktop on multiple virtual machines (VMs) within the client system which have been created using a hypervisor, such as from VMware of Palo Alto, Calif. or Virtual PC, available from Microsoft Corporation of Redmond, Wash. When client virtualization is used to achieve improved security, different VMs are used to run applications from different sources or of different types. For example, an OS in one VM may be dedicated for accessing the corporate network that the user may be part of and running corporate applications (local and web). Another OS in a second VM might be used by the user to run his or her personal programs and store personal documents. Finally, a different OS in a third VM may be used for general web browsing on the wider Internet and running native executables that may have been downloaded from the Internet. An example of such a solution is XenClient, which is made by Citrix Systems of Ft Lauderdale, Fla.

The use of classical client virtualization, as discussed above, to solve the general code isolation problem in the context of Internet endpoints suffers from several drawbacks. A first drawback is that there is too much management overhead for the end-user. The end-user has the onus of making the decision as to what VM to use for each activity. Any mistake, intentional or accidental, may subvert the integrity of the system. While many safeguards can be added as a layer on top of the core virtualization technology to help prevent the user from making mistakes, this has not yet been demonstrated to work in a practical and robust fashion.

An additional drawback is that client virtualization, as described above, suffers from the problem that any VM that is used for general web browsing is just as vulnerable to a security problem as any monolithic system running a single VM while accessing web sites on the general Internet.

Therefore, it is quite likely that the VM dedicated to web browsing described in the arrangement above will be subverted by malware eventually. Any subsequent activities in that VM, then, will be compromised.

Due to these reasons client virtualization has not been used widely to improve the security of Internet endpoints.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION OF THE INVENTION

Approaches for the automated management of isolated environments are presented herein. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form or discussed at a high level in order to avoid unnecessarily obscuring teachings of embodiments of the invention.

Functional Overview

Figure 2:
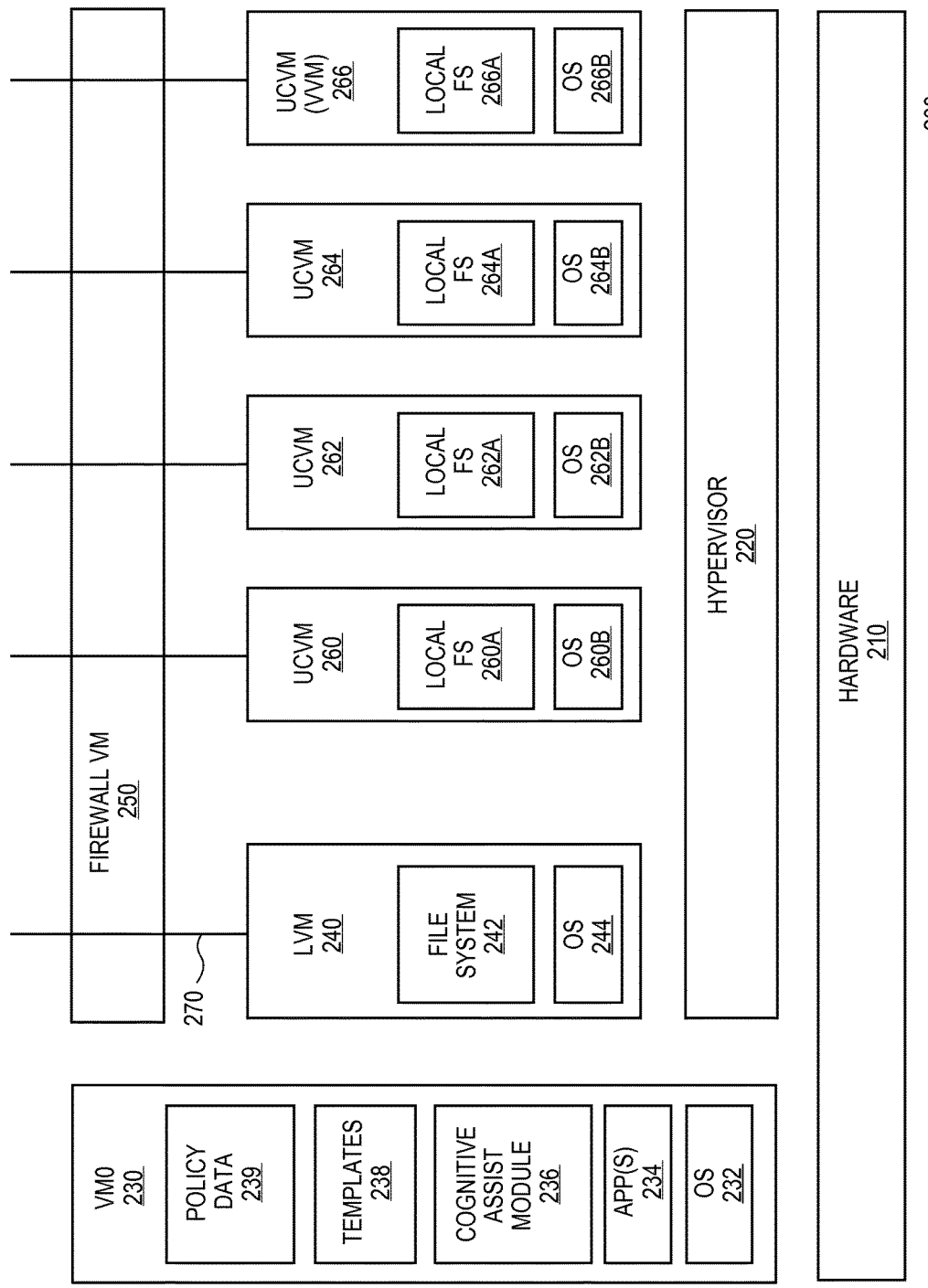
FIG. 2 is an block diagram of the functional components of one embodiment of the invention.

Embodiments of the invention prevent malicious code, introduced into a computer system, from compromising the resources of the computer system through the use of dynamic operating system (OS) micro-virtualization. A computer system of an embodiment includes a number of isolated environments, such as independent virtual machines (VMs), that each executes a full operating system (OS). A block diagram of client 200 according to one embodiment of the invention is shown in FIG. 2. The term "client," as broadly used herein, represents any type of Internet endpoint or computer system capable of connecting to a network and executing a virtual machine. Non-limiting, illustrative examples of client 200 include a PC, a laptop computer, a tablet computer, a cell phone, a personal digital assistant (PDA), and the like.

In an embodiment, client 200 may correspond to a server. Thus, while use of the term "client" in other contexts might exclude an interpretation that includes a server, as broadly used herein, client 200 may be embodied on a wide variety of machines, one example of such being a server. Thus, as the Applicant may be his or her own lexicographer, as used herein, the term client 200 expressly includes a server. For example, non-limiting, illustrative examples of client 200 include a web server, an application server, a file server, a RPD/x-Windows/SSH server, and a cloud server. Indeed, implementing embodiments of the invention upon a server may yield many benefits. The micro-virtualization techniques employed by embodiments provide an efficient mechanism for eliminating the risk of executing untrusted code and/or interpreting untrusted data in accordance with different policies to manage such risk. As such, a device, such as a server, which interacts with (a) numerous sources of untrusted code and/or data and/or (b) two or more corporate entities having different policies towards managing the risk of untrusted code and/or data, may benefit from embodiments of the invention.

Client 200 includes a number of isolated environments (such as 230, 240, 250, and 260, for example) that execute on hardware 210 of client 200. As used herein, the term "virtual machine" refers to an emulation of a computer system. Non-limiting, illustrative examples of a virtual machine include the Intel® SGX environment, virtual containers, and User-Mode Linux (UML). As used herein, the term "isolated environment" refers to an isolated computing environment, one example of which is a virtual machine. To provide a concrete example of certain embodiments, various approaches will be discussed herein with reference to a virtual machine as an example of an isolated environment; however, embodiments of the invention may use a wide variety of different isolated environments.

Client 200 may execute various VMs to separately execute processes associated with different activities. One such VM, namely "VM0" (i.e., VM0 230 of FIG. 2), is secured so that VM0 may serve as the root of trust with a guaranteed integrity. VM0 may contain core operating system 232 and one or more applications 234. In the embodiment shown in FIG. 2, VM0 is not accessible over any network, such as the Internet. As shall be explained below, VM0 provides a secure environment in which operating system 232 and one or more applications 234 may execute without risk of exposure to malicious code.

Other VMs, such as VMs 260, 262, 264, and 266 in FIG. 2, may be created, maintained, and destroyed on-demand using a very efficient micro-virtualizing hypervisor 220. Using efficient micro-virtualization techniques, the latency of starting and stopping activities or applications which run in their own VM in embodiments is very low, thereby providing a practical user experience while employing full OS virtualization.

Embodiments address and overcome many disadvantages, such as the Lack of Isolation Problem, experienced by modern general purpose computer systems that execute code from different sources and of differing trust levels; nevertheless, embodiments maintain compatibility with current typical real-world usage of computer systems by corporate and non-corporate users. This is so because any activity which is not previously deemed trustworthy is performed in a separate VM by certain embodiments, and so all code which may be potentially malicious is executed in its own VM that is destroyed after its immediate use is ended, thereby preventing any malicious code from effecting any lasting change to a computer system according to an embodiment of the invention.

The Trusted Virtual Machine—VM0

In an embodiment of the invention, a special virtual machine, referred to herein as "VM0," is created to be a trusted and secure portion of a computer system. FIG. 2 depicts VM0 230 according to an embodiment. To achieve the property of being trusted and secure, VM0 230 may be permanently disconnected from any network (i.e., VM0 230 is not connected to any local network or the Internet). Specifically, VM0 230 may not contain any type of networking stack, such as a TCP/IP network stack, and may not possess or have access to any networking hardware that could allow for communication between VM0 230 or any applications 234 executed thereby and the Internet. Thus, the only way to install software onto VM0 230 may be to have physical custody of client 200 and manually install the software on VM0 230. Note that a client may contain any number of VM0 virtual machines. While FIG. 2 depicts an embodiment comprising a single VM0, other embodiments may comprise two or more VM0s.

In certain embodiments, one or more applications 234 executing within VM0 230 do not have any access to a network, must be fully self contained in their functionality, and must rely only on local code and data for all their functionality. All applications that need to access the network will therefore need to run in a separate virtual machine outside of VM0 230, as shall be described in further detail below. It is envisioned that the software (such as one or more applications 234) running in VM0 230 be selected at the time client 200 is manufactured or first configured for use in a controlled environment. Because VM0 230 is never connected to any type of network, such as a TCP/IP network, all common types of network initiated attacks cannot be waged against VM0 230, thereby rendering VM0 230 immune to such attacks and safe as compared to any computer or VM that is connected to the Internet. Also, in an embodiment, VM0 230 may execute a different type of operating system than used by UCVMs (discussed below) in client 200. In this way, VM0 230 would be immune or resistant from attacks that typically affect the guest operating systems running in the UCVMs of client 200.

In an embodiment where hypervisor 220 is a Type 2 hypervisor, when client 200 is booted, only VM0 230 is started by the BIOS or firmware of client 200. Once VM0 230 is running, VM0 230 can start hypervisor 220 immediately or on demand. In another embodiment, where hypervisor 220 is a Type 1 hypervisor, hypervisor 220 is first started by the BIOS when client 200 is booted and VM0 230 is launched by the hypervisor 220. Hypervisor 220 is a software component that is responsible for creating other VMs which each execute independent instances of the operating system. These additional VMs are instantiated by VM0 230 and/or hypervisor 220 to run any untrusted code or code that needs to access the network. Untrusted code in this context is any code which has not been pre-approved as being trusted by an IT administrator of client 200. The additional VMs are started "silently" and automatically by client 200, e.g., these VMs are started transparently to the user and without the user having to do anything explicit (note that a user may still manually initiate the creation of a VM in certain embodiments). These additional VMs are also not explicitly visible to the user; instead, all the user sees on the desktop is familiar objects (such as icons, windows, and applications) without any indication that multiple VMs are executing in client 200. Embodiments of the invention follow rules that govern what application activities are assigned to which particular VM. These rules are described below in greater detail.

In another embodiment (not depicted in FIG. 2), VM0 230 may have a networking stack that is firewalled off from the network using well-tested firewall software, thereby allowing VM0 230 to have access to a computer network. Such an embodiment may only allow connections with a specific Internet system so that the software inside VM0 230 may be updated from a designated update server. For example, the firewall software may only allow VM0 230 to connect to one or more servers associated with the IT administrator of client 200 and may prevent VM0 230 from establishing a connection with any other endpoint on any network.

In an embodiment, VM0 230 may communicate with other components of client 200 using secure channels. For example, VM0 230 may communicate with other entities in client 200 using a shared memory channel mediated by a hypervisor. Thus, VM0 230 is not isolated from the remainder of client 200, but nevertheless, processes and data within VM0 230 are resistant from external attacks.

Interaction with a User Interface

All code responsible for generating a user interface (UI) not associated with an application may be maintained in VM0 230. Consequently, all UI interaction activity with the desktop between a user and software executing on client 200 may take place between the user and VM0 230, which maintains a unified desktop for all applications running in all VMs. Interaction between the user and applications running in VMs other than VM0 230 takes place indirectly via VM0 230. For example, when the user enters a password for a web site whose browser and HTML/Javascript code is running in an untrusted VM, the password is first directly provided to VM0 230, which then transfers the information to the untrusted VM. Furthermore, the untrusted VM's display is rendered on to a virtualized display, which is then composed into the VM0 230 desktop (as appropriate) by controlling code running in VM0 230. As code executing in VM0 230 is trusted, the user may trust any user interface controls displayed on a screen since all code responsible for rendering the user interface is trusted.

This approach is quite different from prior systems where often the code that controls the full desktop experience is untrusted. Consequently, if the code responsible for generating the user interface is corrupted by malware, then the user interface may be used as a tool to deceive the user. For example, malware may cause a user interface control to be displayed that requests the user to submit an authentication credential which will be used for improper purposes by the malware. However, this problem is overcome by embodiments of the invention—since all code responsible for rendering user interface controls executes in VM0 in an embodiment, malware is prevented from hijacking or corrupting UI-rendering code.

Figure 7:
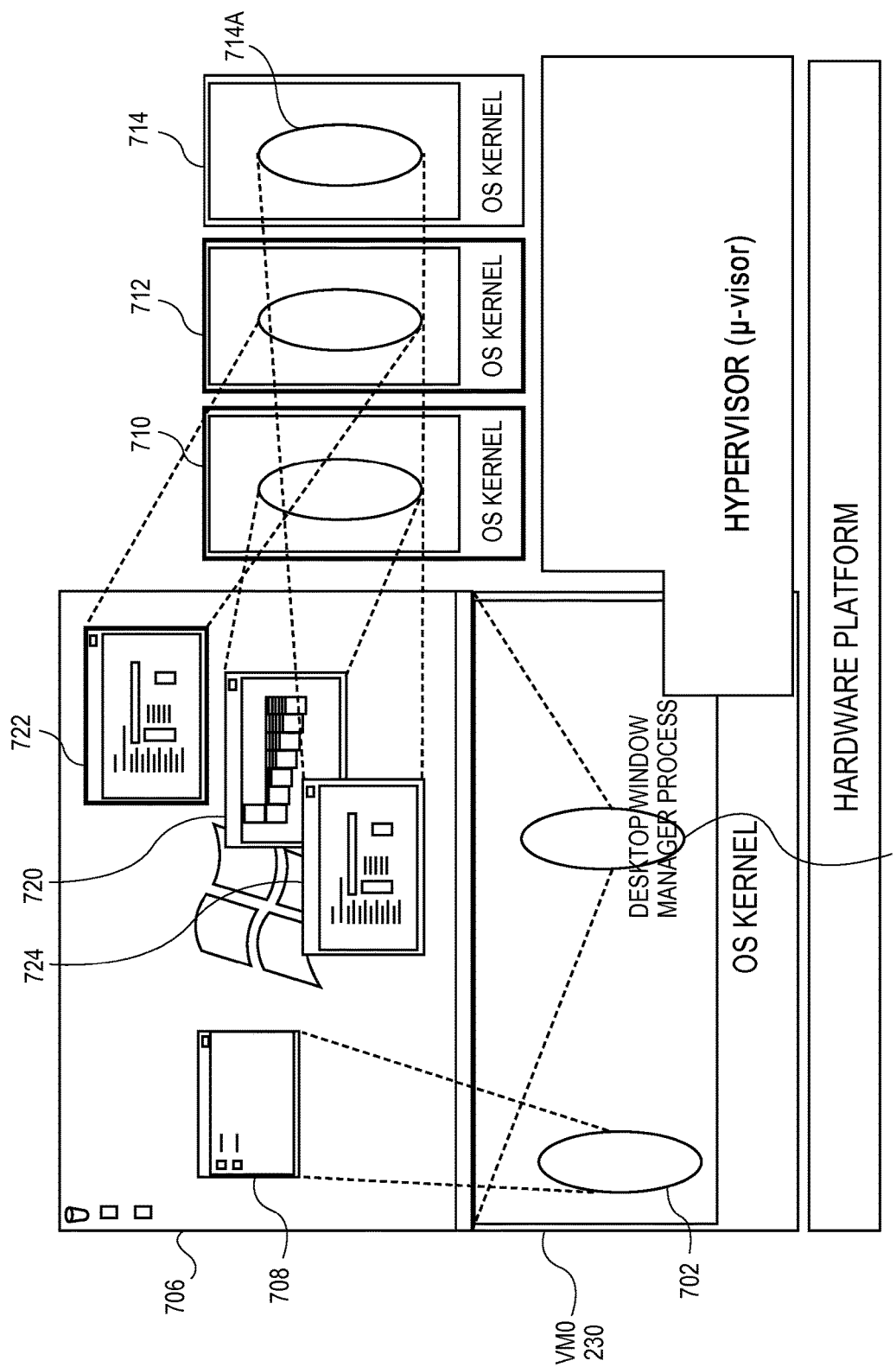
FIG. 7 is an illustration of exemplary desktop of a client according to an embodiment of the invention.

To illustrate an embodiment of the invention, consider FIG. 7, which is an illustration of exemplary desktop of client 200 according to an embodiment. As shown in FIG. 7, process 704 is responsible for rendering desktop 706 on a physical display of client 200. Process 714A runs in untrusted VM 714 and does not have complete access to the file system of client 200. When any process inside VM 714 requests access to the file system of client 200, it is intercepted and process 702 is responsible for rendering a window 708 depicting the contents of the file system of client 200. Process 702 has the option of selectively displaying which contents are available to the VM 714 based on policies as set forth by the IT administrator or the user. VM 710 in FIG. 7 that runs the solitaire game is implemented such that the display of VM 710 is a virtualized display, which is then composed into the desktop 706 (as appropriate) by controlling process 704 running in VM0 230. The displays of VMs 712 and 714 are rendered on the desktop 706 in a similar fashion.

The Legacy Virtual Machine—LVM

FIG. 2 depicts a legacy virtual machine (LVM) 240 according to an embodiment of the invention. LVM 240 may contain operating system 244. LVM 240 serves as the primary entity being managed by the IT administrator of client 200. As such, LVM 240 provides an environment that is analogous to the managed enterprise OS of corporate computer system in that an IT department may install and maintain various enterprise applications within operating system 244 of LVM 240. In an embodiment, operating system 244 of LVM 240 may correspond to a Microsoft Windows OS or any other general purpose OS such as Linux or MacOS.

In an embodiment, LVM 240 is responsible for storing the main file system 242 of client 200. File system 242 may contain the user's profile folder containing the user's settings and files.

LVM 240 typically only runs infrastructure OS programs and programs that are used for the purpose of managing client 200 and trusted enterprise applications. Other user programs (especially those that involve external components or consume untrusted data) do not run in LVM 240, but instead, run elsewhere in separate VMs (such as a UCVM as described in more detail below).

In an embodiment, the network access of LVM 240 is restricted to just the corporate network as implemented by firewall VM 250. Firewall VM 250 is a specialized virtual machine that comprises firewall software/applications to restrict network access of VMs running in client 200 to appropriate and/or necessary network access points. Such practice is consistent with the need for only the responsible IT administrator to be capable of connecting to LVM 240 to manage LVM 240 and processes executing therein.

In one embodiment, LVM 240 and VM0 230 may be implemented in a single virtual machine.

Untrusted Code Virtual Machine—UCVM

When a user wishes to run any application that requires access to either a network or untrusted data (untrusted data is any data that originates from outside client 200), the application is run inside a dedicated VM that is created on-demand by hypervisor 220. This dedicated VM is called an Untrusted Code Virtual Machine (or UCVM). FIG. 2 depicts several UCVMs, namely UCVM 260, 262, 264, and 266. A UCVM operates under the assumption that, in general, any code that connects to the network and interacts with arbitrary code executing on an external device may at some point be compromised. This assumption also applies to trusted applications that interact with data originating from outside the computer system executing the trusted application, because such data may, at some point, contain embedded malicious code. To address such possibilities, such applications are executed in a UCVM to prevent any malicious code, inadvertently introduced into the UCVM, from having the capacity to affect any change outside of the UCVM.

In an embodiment, a UCVM is created by (a) cloning a copy of LVM 240, or a stripped-down version of LVM 240, in memory and (b) providing access to a restricted file system to the newly created UCVM. For example, UCVM 260 comprises restricted file system 260A, UCVM 262 comprises restricted file system 262A, and UCVM 264 comprises restricted file system 264A. Each UCVM possesses its own instance or copy of the operating system, which is isolated and separate from the main operating system (including its code and data) executing within VM0 230 or LVM 240. For example, UCVM 260 comprises operating system 260B, UCVM 262 comprises operating system 262B, and UCVM 264 comprises operating system 264B.

To provide a low latency user experience, UCVMs may not be booted from scratch each time an application is needed to be started. Instead, a UCVM may be created very quickly by cloning the UCVM from a template VM (with a booted OS) that has been pre-loaded in memory at system boot time. In an embodiment, the template used to clone a UCVM may be selected from templates 238 stored in VM0 230. A variety of techniques can be employed to make this cloning operation as fast as a few 100 milliseconds. Multiple types of templates may be used by a system to create UCVMs depending the nature and type of application(s) to be run inside the UCVM, as discussed in greater detail below in the section entitled "Cloning a UCVM from a Template."

Cognitive assist module 236 is software that is responsible for implementing the rules and policies of embodiments as well as helping the user of client 200 in understanding and navigating the security model employed by client 200 on an as-needed basis. Cognitive assist module 236 helps decide what activities run in which UCVMs, including when VMs are created or destroyed, and what kind of access to network and file system resources each UCVM has. Cognitive assist module 236 also helps protect the user, e.g., when a user is fooled by malware running in a UCVM and is in the process of providing some information that they have previously provided to enterprise code running in LVM 240 (for example a password), then cognitive assist module 236 may detect this situation and prevent the user from providing the information (which may be secret corporate information) to the malware.

Regarding the restricted file system of each UCVM, each UCVM has access to a private copy of a subset of the files in file system 242 on client 200. A UCVM may only have access to those files which the UCVM should need for the correct operation of the application executing therein. For example, user files are usually not required for correct operation of an application executing in a UCVM and thus are not typically exposed to a UCVM. On the other hand, if a UCVM is created as a result of the user wishing to edit a document using an application, such as MS Word, then a copy of the document the user wishes to edit will be provided to the restricted file system of the UCVM at the time the UCVM is created. Advantageously, using UCVM 260 as an example, if a process executing within UCVM 260 makes any changes to any files in restricted file system 260A, then these changes do not impact the files stored in file system 242 maintained in LVM 240 because such changes are only made to restricted file system 260A maintained in the UCVM and are not propagated, without express consent from the user, to file system 242 maintained by LVM 240.

In a typical use case of a UCVM, the UCVM may run a local application or an individual web page session. When a user is done running the local application or navigates away from a web page to another page with a different Internet URL domain, the corresponding UCVM is destroyed. Any new local application or web application will be run inside a brand new, separate UCVM that is cloned again from a clean UCVM master template. Thus, if there has been any compromise to the UCVM during the course of running some malicious code that was introduced into the UCVM, then the adverse affects of the security breach are isolated to only the affected UCVM and are lost when the UCVM is destroyed.

For example, assume that a user double-clicks on a MS Word document icon in Windows Explorer. Embodiments create a special UCVM to run the MS Word process. In a particular embodiment, cognitive assist module 236 of VM0 230 may dynamically create the UCVM using a template in one or more templates 238 or use a pre-existing template in memory or on the disk. The template selected by cognitive assist module 236 may be selected based on what activity is to occur within the UCVM, i.e., the selected may be designed to create a UCVM having characteristics that are optimal for running a text editor therein. The created UCVM contains a copy of the operating system as well as a restricted (local) copy of the file system. This local copy of the file system in the UCVM contains all the usual Windows and Program files; however, the user's profile folder in the local copy of the file system contains only the single target MS Word document being opened.

As another example, assume that three tabs are open in a web browser and further assume that each tab is open at a different web page. In consideration of the code which may be contained or embedded on a web page, each web page may be properly considered a web application. In embodiments of the invention, the code responsible for rendering the user interface (UI) of the web browser runs in VM0 230. On the other hand, executable code for the three web applications runs in three separate UCVMs. A core HTML/Javascript engine runs in each of the three UCVMs. A copy of the file system within each of the three separate UCVMs does not contain any part of the user's files, as they are not required for the task performed by each UCVM, namely displaying a web page. Thus, each web application (or web page in this example) is completely isolated from the rest of the system.

In an embodiment, a UCVM may be connected to the Internet according to an access policy determined by the nature of the code running within the UCVM. To illustrate, web pages are typically restricted as per a strict "same origin policy" similar to the rules implemented by modern web browsers. In the "same origin policy," scripts running on web pages are permitted to access methods and properties of other scripts originating from the same site with no specific restrictions, but are prevented from accessing most methods and properties across web pages on different sites. Untrusted native applications running outside of the web browser are restricted by default to be able to connect only to the domain from which the program was downloaded (and to specific content delivery networks (CDNs) that may be in use by the domain in question).

This level of network access for downloaded applications can be explicitly changed (increased or decreased) by the end-user to include additional sites on the Internet. End-user control over what a UCVM can connect to may be subject to certain limitations related to corporate networks and sensitive web sites (such as a bank and web mail provider). For example, any code running in a UCVM may not, in general, access any site on a corporate Intranet to which client 200 is connected. Applications that need to connect to the corporate Intranet may need to be signed by the IT administrator of the domain. Similarly, non-web untrusted application code in a general UCVM may not connect to a web site associated with a search engine or bank or other sites that may have been previously identified as being "off limits." These connections can only be made through a web browser (which spawns UCVMs bound to these special domains) or from a special purpose LVM called a VVM, which described in further detail below.

In an embodiment, there is no communication channel available for an application running in one UCVM to communicate with an application running in another UCVM. Thus, applications running in UCVMs are completely isolated from each other and from the other applications in the system. This is well suited for running downloaded third party local applications which are generally designed to be self-contained or for Internet applications (web pages are not supposed to rely on any communication between applications within the web browser). In an alternate embodiment, communication between an identified set of virtual machines can be enabled by a person with sufficient privileges, such as an IT administrator for client 200.

Firewall Virtual Machine

In an embodiment, the implementation of the network access restrictions is done in a dedicated VM called a firewall VM. FIG. 2 depicts an exemplary firewall VM 250 of an embodiment. Firewall VM 250 runs an isolated operating system with a dedicated and fixed set of firewall applications that implement the network access policy for all VMs in client 200 (except perhaps VM0 230, which may not have any network access). Firewall VM 250 may provide, to any virtual machine running on client 200 in which untrusted code is executed or untrusted data is being interpreted, restricted access to only those network resources deemed necessary on an as-needed basis in accordance with a policy described by policy data stored on client 200.

In another embodiment of the invention, the firewall functionality of the system may be co-located and implemented inside either the hypervisor 220 of FIG. 2, or inside the LVM 240 of FIG. 2 (working in conjunction with the hypervisor 220 of FIG. 2), or inside VM0 230 of FIG. 2 (working in conjunction with the hypervisor 220 of FIG. 2).

Validated Virtual Machines—VVMS

UCVMs are not appropriate to run local applications that interact heavily with each other using local APIs such as COM, as typically there is no communication channel available for an application running in one UCVM to communicate with an application running in another UCVM. Embodiments may employ one (or more) special UCVMs called a Validated Virtual Machine (VVM) for the purpose of running relatively trusted local applications that have complex interactions between the applications. Such complex interactions are common in enterprise frameworks containing multiple applications, such as Microsoft's Office Suite and IBM's Lotus Notes.

FIG. 2 depicts an exemplary VVM 266 of an embodiment. Note that while FIG. 2 depicts a single VVM for ease of explanation, other embodiments of the invention may employ two or more VVMs or no VVMs based upon the particular needs of the user and/or policies of the organization responsible for or the owner of client 200.

Applications need to be signed and configured for co-location in the same VM by an administrator of client 200 before they can run in VVM 266. Inside VVM 266, signed applications can interact with each other using all types of APIs and frameworks supported by the OS being used. In an embodiment, the default network access policy of a VVM is to allow access to a corporate network only. The IT administrator may increase or decrease this level of access, subject to certain restrictions.

In an embodiment, specific signed applications or suites (groups of applications) that originate from a trusted source (other than the enterprise) may also be designated to run together in a particular VVM responsible for applications originating from that source. For example, all non-corporate applications that are signed by a specific vendor may be run together in a single VVM. These applications would then be isolated from corporate applications and general untrusted applications, but not from one another. A specific network access rule that is more permissive than the "same origin policy" used for web applications and unsigned applications may be used for a VVM. The restricted copy of file system 242 exposed to a VVM is similar to that exposed to a generic UCVM in that the restricted copy of file system 242 exposed to a VVM comprises only those files related to, or required for, performance of the applications executing within the VVM.

The Restricted File System Exposed to a VM

Figure 3:
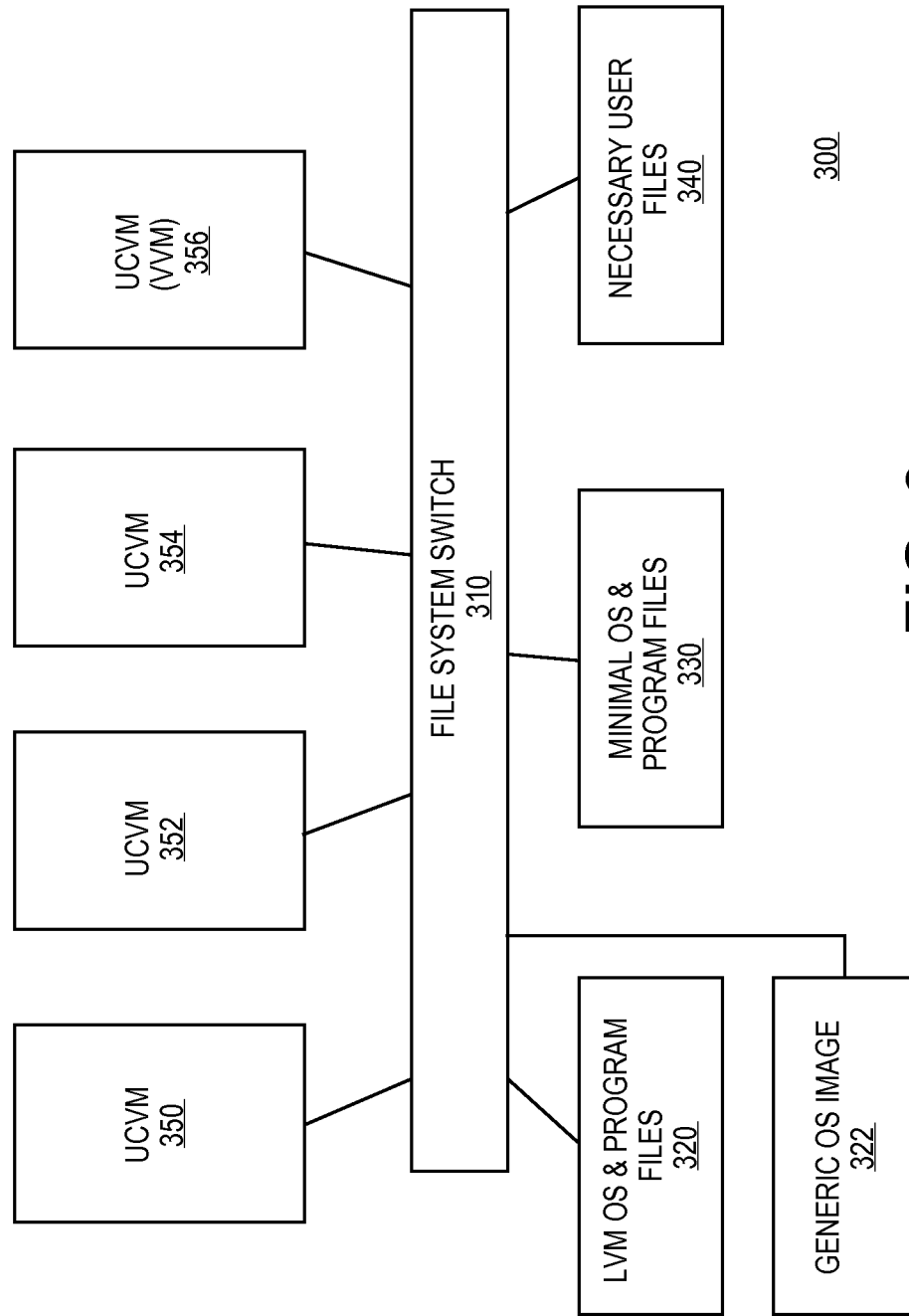
FIG. 3 is block diagram of the functional components involved in exposing a restricted copy of the file system to different UCVMs (and VVMs) according to an embodiment of the invention.

FIG. 3 is block diagram of the functional components involved in exposing a restricted copy of file system 242 to different UCVMs (and VVMs) according to an embodiment of the invention. File System Switch 310 is software that is configured to provide the newly created UCVM with access to a copy-on-write clone of the OS image that the UCVM was created from once the UCVM has started. The minimal operating system and program files 330 in the copy-on-write clone may be created from either the corporate LVM OS image 320 or a separate generic stripped down OS image 322 which may be created by the IT administrator.

Furthermore, a newly created UCVM is provided a copy of necessary user files 340, which are a subset of the user files in file system 242. The composition of necessary user files 340 will be different for each user. The set of files comprising the user files in file system 242 maintained in LVM 240 are typically those files in the user's home folder, e.g., c:\Users\<username>. The particular copies of files that are provided to a particular UCVM as necessary user files 340 are the minimum set of files that are needed by that UCVM to accomplish what the user intended to do as captured when the target application was being invoked. For example, if the user double clicked on a specific MS Word file named ABC.docx at the location c:\Users\<username>\Documents in the file system 240 maintained in LVM 240, then necessary user files 340 would only include a copy-on-write clone of the ABC.docx file and only this copy-on-write clone of the ABC.docx file is made available in the virtual c:\Users\<username>\Documents folder made visible to the newly created UCVM running the MS Word application. If a program (like MS Word) was started without any association with a file, then necessary user files 340 would correspond to an empty c:\Users\<username>\Documents virtual folder.

Any application running in a UCVM therefore only has access to the particular set of user files provided explicitly by the user when the program was invoked. Subsequently, if the user wants to browse file system 242 for another file from within the application (for example, by using the File→Open menu item of MS Word), then he or she will see a restricted user files directory.

Figure 4:
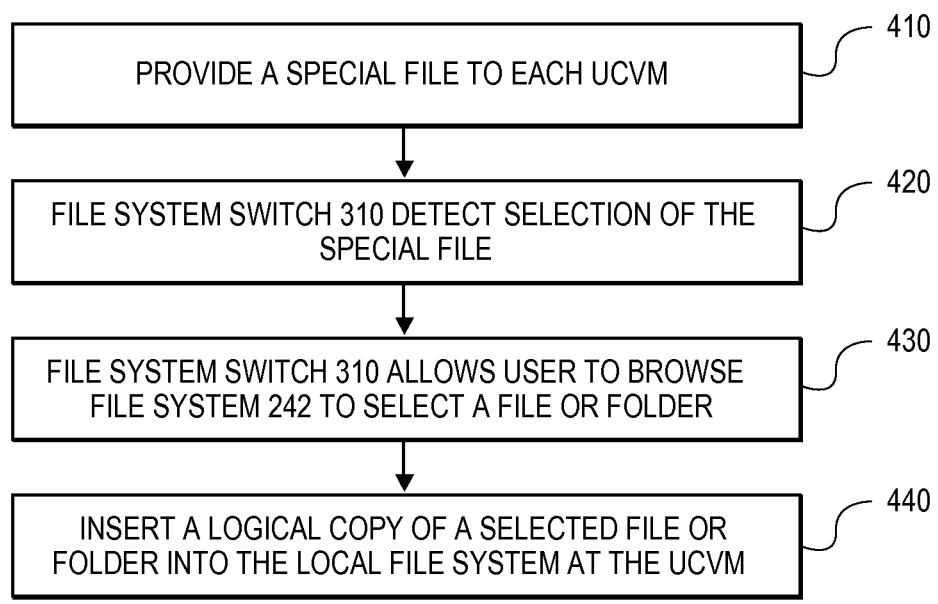
FIG. 4 is a flowchart illustrating the steps involved in a UCVM obtaining a copy of a new user file maintained in the file system stored elsewhere according to an embodiment of the invention.

To enable the user to select files from the user's own User Files folder in file system 242 maintained in LVM 240 using an application executing within an UCVM, a user interface may be provided to allow the user to browse his or her files in file system 242, select one or more of the user files, and expose a copy of the selected files to the appropriate UCVM. For example, FIG. 4 is a flowchart illustrating the steps involved in a UCVM obtaining a copy of a new user file maintained in file system 242 according to an embodiment of the invention. In step 410, a special file is provided to each UCVM. The special file may be provided to the UCVM in a number of different ways, e.g., the special file may be inserted into each folder of the virtual C:\Users\<username>directory provided to each UCVM. This special file may be named something akin to "Show All My Files" or the like, as its selection will be used to trigger exposing additional copy-on-write clones of files stored in file system 242 to the UCVM.

In step 420, File System Switch 310 detects when the special file is selected by the user. For example, when a program executing within a UCVM browses to the special file, presumably as a result of a user click, this action may be trapped by File System Switch 310.

In step 430, File System Switch 310 invokes a dialog with LVM 240 that allows the user to browse the full file system 242 maintained in LVM 240. The user may then select a file or folder in file system 242. Note that at this stage, the user may be granted read access to the full file system 242 for purposes of selecting a file or folder, but the user is not granted write access to file system 242. Therefore, the user is prevented from modifying file system 242 maintained by LVM 240 in any way.

In step 440, after the user selects a file or folder, a copy of the selected file or folder is created. The copy of the selected file or folder is then inserted into the restricted file system associated with the UCVM. As a result of inserting the copy of the selected file or folder in the restricted file system associated with the UCVM, an application executing in the UCVM may have read and write access to the copy of the selected file or folder in the virtual file system, but is prevented from effecting any change to the original copy of the selected file or folder in file system 242 maintained by LVM 240.

The steps of FIG. 4 ensure that files in file system 242 maintained by LVM 240 are not visible to a UCVM without explicit permission from the user. Malicious code running in a UCVM, for example, cannot programmatically access files in file system 242 in LVM 240. Further, malicious code running in a UCVM also cannot render a false user interface to trick the user into unintentionally providing any user files to the malicious code, since all code responsible for rendering the user interface is maintained within VM0 230, and thus, unreachable and un-hackable by the malicious code.

File System Switch 310 may be implemented in a variety of ways. For example, in one embodiment, File System Switch 310 may be implemented by a network file system protocol (NFS or CIFS may be used). A special VM (or LVM 240) may be used as the OS serving the "User Files" shared file system. Other VMs "mount" this shared file system using NFS or CIFS (or another network file system) from the hosting VM. Application software in the hosting VM may decide what files are exposed to which VM based on instructions provided by VM0 230.

In another embodiment, File System Switch 310 may be implemented, in part, by a proprietary protocol for handling communications between the different UCVMs and File System Switch 310. File System Switch 310, in such an embodiment, may be implemented as part of a special VM or in LVM 240.

Cloning a UCVM from a Template

In an embodiment of the invention, every virtual machine created in client 220 is instantiated using a template selected from one or more templates 238 stored in VM0 230. In an embodiment, each template in one or more templates is either immutable or may be updated in a very controlled fashion. Advantageously, virtual machines may be instantiated in this fashion with requiring the booting of the virtual machine.

Each of one or more templates 238 may be used to instantiate or create a virtual machine with different characteristics or operational parameters. The characteristics or operational parameters described by a template may be configured, tailored, or suited for a particular context or type of processing activity. For example, each template may specify what type of code is to be run within a virtual machine created using the template, a size of the virtual machine created using the template, firewall settings for the virtual machine created using the template, what type of virtual machine (for example, a VVM, UCVM, or a LVM) is the be created using the template, how changes to a local file system within the virtual machine created using the template are to be persisted, and what portion, if any, of the network can a virtual machine created using the template access.

One or more devices internal to client 200 or externally connected to client 200 may interact with one or more processes executing in a virtual machine within client 200. In an embodiment, a template may assign responsibility for a selected set of devices to a virtual machine created using the template. In other embodiments, responsibility for a selected set of devices may be assigned to a particular virtual machine by virtue of policy data stored on client 200. Such policy data may describe one or more policies provided to client 200 from an owner or responsible organization of client 200. Policy data of this nature may be maintained by VM0 230 or LVM 240, for example, in certain embodiments.

In an embodiment, one or more templates 238 may be arranged in a hierarchy such that there is a root node corresponding to a template having a default set of characteristics. The root node may have one or more child nodes, and each of these child nodes may be associated with a template that inherits the properties of the parent template, but contains additional or changes properties associated with that child node. Naturally, each child node may also have children, and so the hierarchy of templates may be an arbitrary number of levels deep, where each template inheriting characteristics of its parent, but yet each template is capable of further defining or changing characteristics that distinguishes the template over its parent.

Branches of the hierarchy of templates may be associated with, or more particularly suited, different types of activity. For example, certain templates may be associated with corporate activity, and may therefore specify characteristics related to virtual machines running corporate applications. Similarly, certain templates may be associated with the user's personal application's activity or Internet/Web related activity, and may therefore specify characteristics related to virtual machines running the user's own applications or Internet/Web applications respectively.

Figure 5:
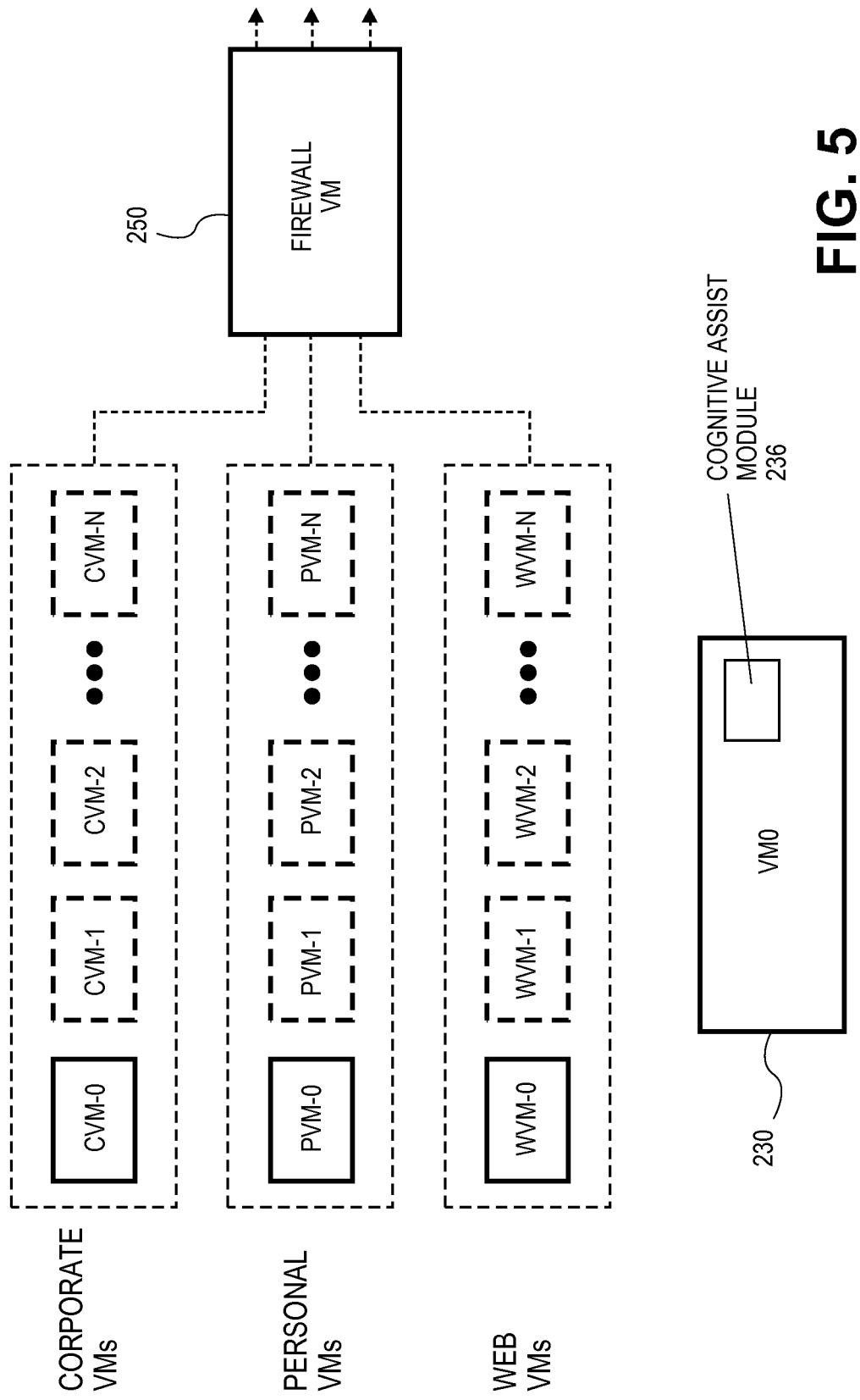
FIG. 5 is an illustration of instantiating a plurality of different virtual machines using different templates according to an embodiment of the invention.

FIG. 5 is an illustration of instantiating a plurality of different virtual machines using different templates according to an embodiment of the invention. In FIG. 5, CVM-0 represents a template that defines a virtual machine having characteristics suitable for running a corporate application, PVM-0 represents a template that defines a virtual machine having characteristics suitable for running a user application (non-corporate), and WVM-0 represents a template that defines a virtual machine having characteristics suitable for running an Internet application. Other embodiments of the invention may define a variety of other templates to define different types of templates. In the example of FIG. 5, cognitive assist module 236 in VM0 230 may use CVM-0 to instantiate one or more corporate virtual machines, such as CVM-1, CVM-2, etc. Similarly, cognitive assist module 236 may use PVM-0 to instantiate one or more personal (non-corporate) virtual machines, such as PVM-1, PVM-2, etc., and cognitive assist module 236 may use WVM-0 to instantiate one or more web-based virtual machines, such as WVM-1, WVM-2, etc. As depicted in FIG. 5, each instantiated UCVM connects to an external network through Firewall VM 250. Cognitive assist module 236 can either create these templates on demand or create and store them while monitoring the usage of the client.

Installation of Software

In the normal operation of a typical PC, a fair amount of after-market software is installed. Such after-market software installed on a PC generally falls into one of two categories, namely (a) validated software (packages or straight executables) installed by the IT administrator of the PC or (b) end-user installed software (including web browser plugins & extensions, more complex software packages that go through an explicit install phase, and straight executables that can be executed without an explicit installation phase). Note that end-user installed software may be signed (by a verifiable, known vendor) or unsigned.

In embodiments of the invention, installation of validated software is performed as is normally performed today. The IT administrator can manage corporate validated software using embodiments using similar procedures as performed today, except that such corporate validated software are installed in LVM 240 (or if need be, VVM 266).

With respect to end-user installed software, IT administrators have two choices for how they would like to handle this type of installation using embodiments of the invention. The first choice is for the IT administrator to lock down client 200 by disallowing any installation of end-user installed software. While this is a safer operating decision, this approach may reduce the end-user's productivity because the end user cannot take advantage of applications that may be otherwise useful that have not yet been validated by the IT administrator. The IT administrator may provide installation support on an individual and as-needed basis whenever a user wishes to install any end-user installed software; however, doing so will increase the cost of support by the IT administrator.

The second choice is for the IT administrator to allow the user to install end-user installed software him or herself using features provided by embodiments of the invention. End-user installed software may include browser plugins, browser extensions, signed and unsigned installation packages, and straight executables. Browser plugins are installed into an installed browser plugin database that is maintained in a particular UCVM. The installed browser plugin database may be implemented, in an embodiment, using file and registry diff store 820 shown in FIG. 8, which is an illustration of safely installing an untrusted application according to an embodiment of the invention of the invention. During installation of a plugin, the installed browser plugin database is also updated to record the domain that was used to initiate the plugin install. Presumably, this is the web page that contains an element or component that requires the plugin to render the complete content in the web page. Subsequently, the web browser loads an installed plugin into a web HTML/JS engine instance (which runs inside a UCVM) only if the domain of the web page to be displayed by the UCVM matches a domain, recorded in the plugin database, associated with the installed plugin. A plugin that is used by multiple sites is installed only once, but is associated with multiple domains. Popular plugins like Flash may be pre-installed in certain embodiments.

Browser extensions may be installed into a web browser's extension database that is maintained in a particular UCVM. During runtime, browser extensions are treated like web applications in that each browser extension is run inside its own UCVM. In an embodiment, the web browser extension database and the installed browser plugin database may be implemented in the same database in a single UCVM.

Signed installation packages may be run and the resulting installation may update either the LVM image or the Generic Windows image based on a policy set by the IT administrator.

Figure 8:
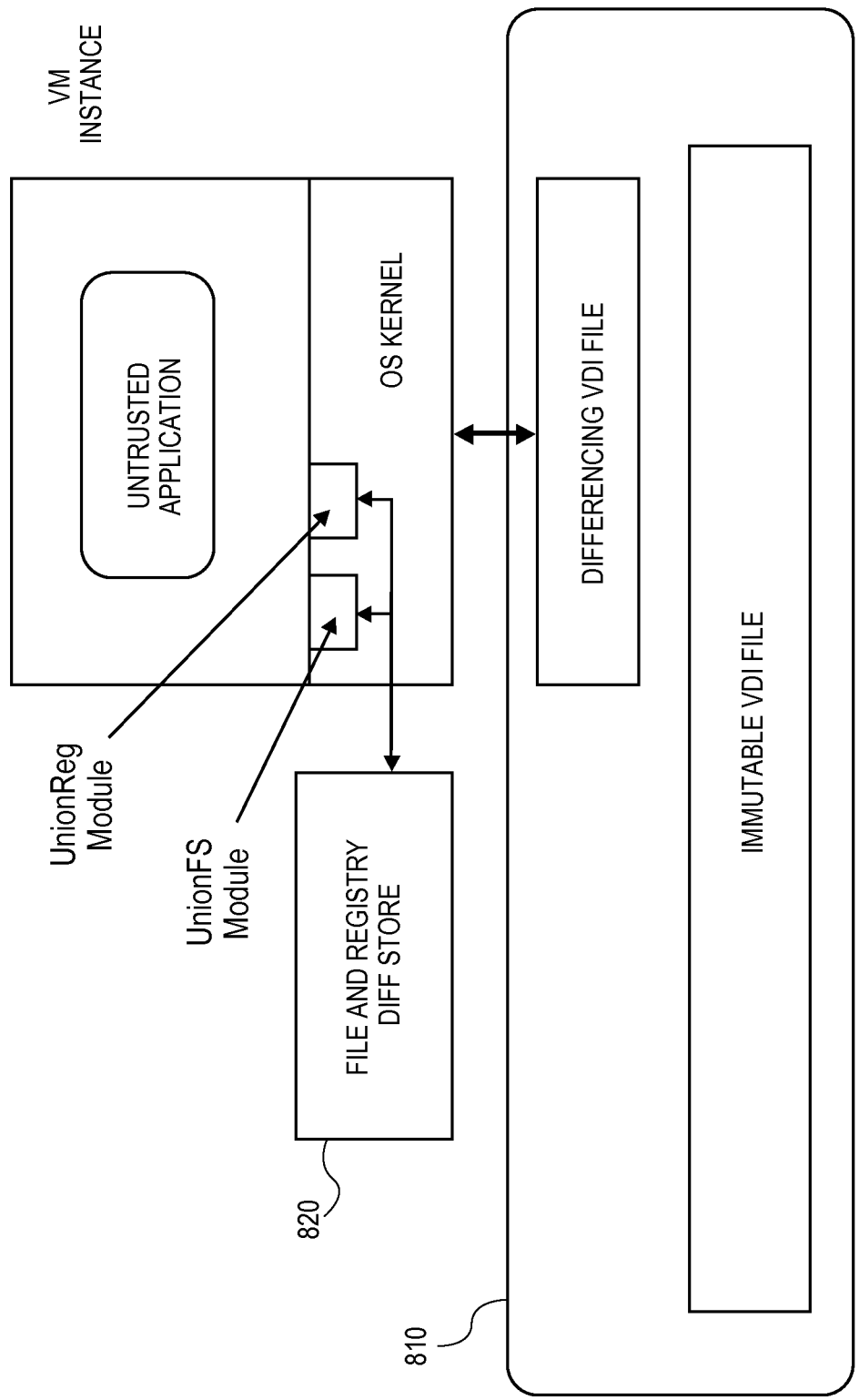
FIG. 8 is an illustration of safely installing an untrusted application according to an embodiment of the invention.

Unsigned installation packages go through a virtual install. The virtual installation of unsigned installation packages will be described with reference to FIG. 8, which is an illustration of safely installing an untrusted application according to an embodiment of the invention of the invention. A registry and program files change set is created and stored in file and registry diff store 820. Start-menu and desktop changes by the installer are captured in a special folder which contains desktop and start menu items for all user-installed applications. Subsequently, if an unsigned application is run, it is run in a UCVM cloned from the Generic Windows image all by itself. Virtual disk 810 in FIG. 8 is the normal virtual disk of the UCVM. DiffStore 820, which further virtualizes the file system and the registry as seen by the applications of UCVM, is typically implemented as a separate module outside of the normal block level virtual disk store.

Signed and unsigned executables may be run in a UCVM. Such a UCVM may be created on demand and destroyed after its use is ended by embodiments.

Managing Web Cookies and Caches

A web cookie (or simply "cookie") is a piece of text stored on a user's computer by their web browser. A cookie can be used for authentication, storing web site preferences, shopping cart contents, the identifier for a server-based session, or anything else that can be accomplished through storing text data.

While the actual cookie itself is not visible to the user, the user would notice a difference in the user experience of interacting with a web site if cookies could not be saved between visits to the web site. Accordingly, embodiments of the invention provide mechanism to store cookies before a UCVM is destroyed, so that the next time the user visits the web site using a web browser running in a different UCVM, any cookies that have been stored and are associated with that web site may be injected into the new UCVM.

Similarly, to provide the best user experience, it would be advantageous to carry over the cache of a web browser for a particular web domain from one UCVM to the next, so that the next time the user visits the web domain using a different UCVM, there is no a delay in displaying content due to an unpopulated cache. Thus, embodiments of the invention provide mechanism to store the web cache of a web browser for a web domain before a UCVM is destroyed, so that the next time the user visits the web site using a web browser running in a different UCVM, the cache of the web browser need not be warmed (i.e., repopulated), as the cache in the new UCVM has been updated to contain all the objects the cache previously contained in the prior, and now destroyed, UCVM used to visit the web domain.

To provide a concrete example with reference to the example of FIG. 2, assume that a user initially transparently uses UCVM 260 to run a web browser to visit web site A. When UCVM 260 is destroyed, any cookies and cache files are extracted and saved. Thereafter, assume the user transparently uses UCVM 262 to run a web browser to visit web site B. As web site B is hosted by a different web domain than web site A, the previously stored cookies and cache files associated with web site A will not injected into UCVM 262. Thereafter, if UCVM 262 is destroyed, then any cookies and cache files are extracted and saved. At a later point in time, if the user thereafter transparently uses UCVM 264 to run a web browser to visit web site A, then the previously stored cookies and cache files associated with the web domain of web site A will be injected into UCVM 264. This allows the web browser running in UCVM 264 to visit web site A to appear, to the user, to have the same state of the prior web browser used to visit web site A, even through different virtual machines are used between visits. Note that no portions of the file system are saved between visits to a web site; only the state of the web session is saved.

In one embodiment, the cookies and cache information is captured in Diff Store 820 associated with the URL of the website. In each visit to the same URL, the UCVM utilizes the same Diff Store presenting the cookies and caches to the UCVM. In another embodiment, the cookies and cache files can be captured at the end of the session and saved to the client system's core file system in a special folder. On visiting the same URL again, the cookies and cache can be re-injected into the file system of the UCVM.

Efficient Physical-to-Virtual Disk Conversion

Platform virtualization is performed on a given hardware platform by host software (a control program), which creates a simulated computer environment, a virtual machine, for its guest software. A hypervisor, also called virtual machine manager (VMM), is one of many hardware virtualization techniques that allow multiple operating systems, termed guests, to run concurrently on a host computer. The hypervisor presents to the guest operating systems a virtual operating platform and manages the execution of the guest operating systems. A guest OS executes as if it was running directly on the physical hardware. Access to physical system resources such as the network access, display, keyboard, and disk storage is suitably virtualized so that guest OS does not know these are virtual devices.

Generally, there are two types of hypervisors. Type 1 (or native, bare metal) hypervisors run directly on the host's hardware to control the hardware and to manage guest operating systems. A guest operating system thus runs on another level above the hypervisor. Type 2 (or hosted) hypervisors run within a conventional operating system environment. With the hypervisor layer as a distinct second software level, guest operating systems run at the third level above the hardware. In other words, Type 1 hypervisor runs directly on the hardware; a Type 2 hypervisor runs on another operating system, such as Windows. Embodiments of the invention may use any type of hypervisor. Thus, hypervisor 220 in FIG. 2 may either be a Type 1 or a Type 2 hypervisor.

A virtual disk image is a file on a physical disk, which has a well-defined (published or proprietary) format and is interpreted by a hypervisor as a hard disk. In terms of naming, a virtual disk image may have a specific file type extension, e.g., .vmdk for VMware VMDK, .vhd for Xen and Microsoft Hyper-V, and .vdi for Oracle VM VirtualBox.

There are two approaches employed for storage allocation by prior hypervisors, namely, (1) pre-allocate the entire storage for the virtual disk upon creation and (2) dynamically grow the storage on demand. In the former approach involving pre-allocation, the virtual disk may be implemented as either split over a collection of flat files (typically one is 2 GB in size) or as a single, large monolithic flat file. In the latter approach involving on-demand growth, the virtual disk may also be implemented using split or monolithic files, except that storage is allocated on demand.

There are two modes in which a disk can be mapped for use by a virtual machine. In a virtual mode, the mapped disk is presented as if it is a logical volume, or a virtual disk file, to the guest operating system and its real hardware characteristics are hidden. In a physical mode, also called the pass through mode, the hypervisor bypasses the I/O virtualization layer and passes all I/O commands directly to the disk.

A virtual machine (VM) is a software implementation of a machine (i.e. a computer) that executes programs like a physical machine. Virtual machines allow the sharing of the underlying physical machine resources between different virtual machines, each running its own operating system. The software layer providing the virtualization is called a hypervisor, such as hypervisor 220 in FIG. 2.

Virtual machines each require their own image of the operating system. The guest OS and host OS typically do not share the OS image, even if they are the same OS. This is problematic for several reasons. First, if a user wishes to run 10 different virtual machines, then she will require 10 different copies of the OS for the guest OSs, which requires an undesirable amount of storage to maintain. As she is already running one virtual machine at the host, the total number of different copies of the OS required would be 11. Second, the OS for a VM has to be created either by installing a new OS or shipping a copy of the OS from somewhere else, which is burdensome for those who do not have access to OS images. Further, it is also time consuming to install a new OS or ship an OS image, which is typically quite large. A third problem is that any software present in the host OS (such as a printer driver) will not be available in a guest OS unless it is installed again.

Shadow Copy (Volume Snapshot Service or Volume Shadow Copy Service or VSS) is a technology included in Microsoft Windows that allows taking manual or automatic backup copies or snapshots of data (termed "shadow copies"), even if it has a lock, on a specific volume at a specific point in time over regular intervals. VSS operates at the block level of the file system. Shadow Copy is implemented as a Windows service called the Volume Shadow Copy service. Software VSS provider service is also included as part of the Microsoft Windows OS to be used by Windows applications. Shadow Copies can be created on local and external (removable or network) volumes by any Windows component that uses this technology, such as when creating a scheduled Windows Backup or automatic System Restore point.

Snapshots have two primary purposes. First, they allow the creation of consistent backups of a volume, ensuring that the contents cannot change while the backup is being made. Second, they avoid problems with file locking. By creating a read-only copy of the volume, backup programs are able to access every file without interfering with other programs writing to those same files. Through the integration between the Volume Shadow Copy Service, hardware or software VSS providers, application level writers and backup applications, VSS enables integral backups that are point in time and application level consistent without the backup tool having knowledge about the internals of each application. The end result is similar to a versioning file system, allowing any file to be retrieved as it existed at the time any of the snapshots was made. Unlike a true versioning file system, however, users cannot trigger the creation of new versions of an individual file, only the entire volume.

Figure 6:
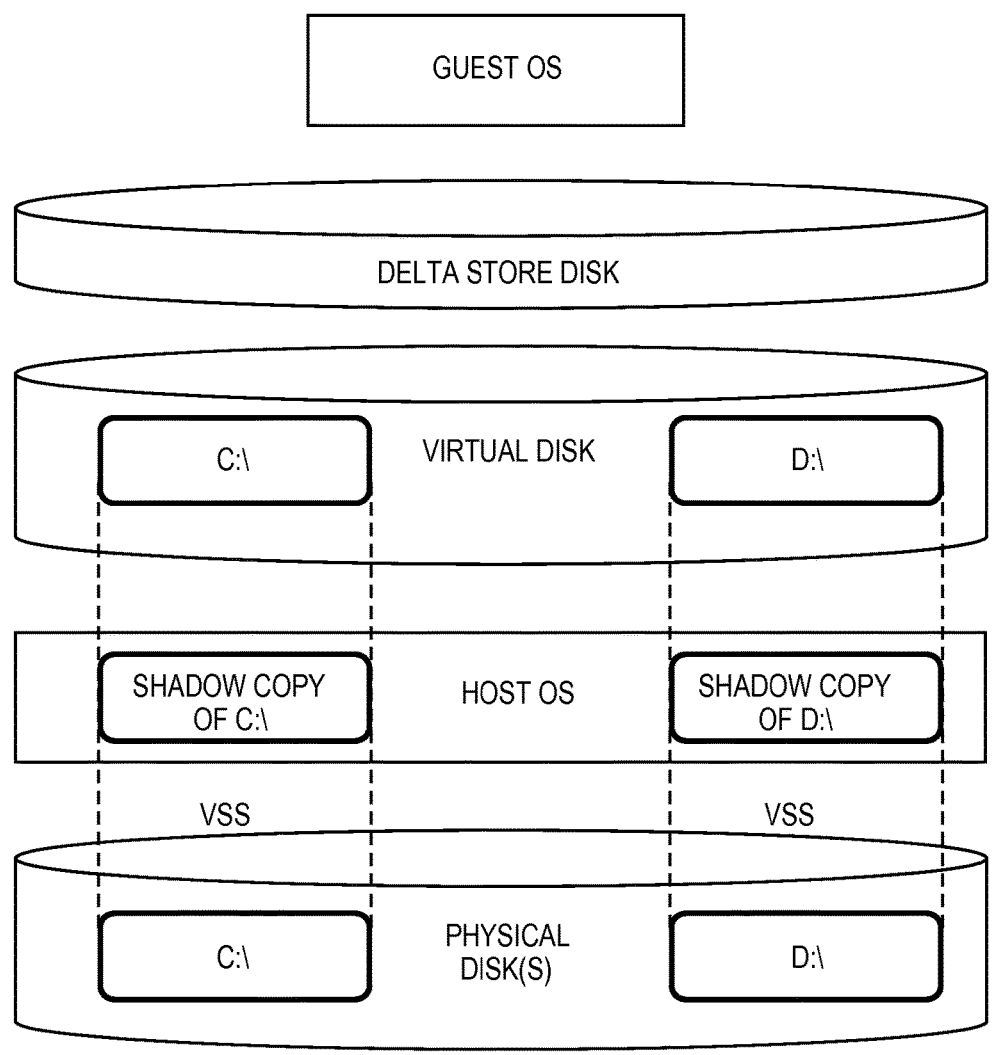
FIG. 6 is an illustration of a virtual disk based on VSS shadow copies according to an embodiment of the invention.

Embodiments of the invention overcome this limitation by creating virtual disks based on VSS shadow copies. FIG. 6 is an illustration of a virtual disk based on VSS shadow copies according to an embodiment. The virtual disk of FIG. 6 allows for many guest OSs running on the same host to share the same OS copy with the host OS. VSS shadow copies may be created fast and efficiently. Creating virtual disks on top of VSS is also a very fast operation, which means that VMs (with same OS as host OS) can be created very efficiently. Shadow copies are also maintained cheaply by windows OS by keeping the changes since the time shadow was created. Hence, the disk usage of multiple VMs is reduced substantially. VMs can also be maintained very efficiently since VSS snapshots can be updated once and have the changes reflected in all VMs. Since a VSS shadow copy contains all the software the user has installed on the machine at the time of the VSS shadow copy creation, virtual disks also receive access to all the software. Moreover, the version of the software, including any patches installed, is exactly the same. In addition to all the software, user documents are also visible to virtual machines. A virtual disk of an embodiment is an accurate point-in-time copy of host physical disk.

In an embodiment where VSS snapshots are read-only, a 'Delta Store Disk' may be attached to the virtual disk. The Delta Store disk is used to capture all the changes being made to the virtual disk.

Security Afforded by Embodiments

Embodiments of the invention provide a secure environment to prevent malicious code from affecting any lasting change in a computer system. Arbitrary code (either a web application or a native executable) runs inside an isolated operating system running on an isolated virtual machine. This code has no access to any other application (either a native application or a web application) being run by the user because those applications run in other operating systems running in separate virtual machines. Moreover, arbitrary code has access to only the specific part of the file system that is needed for correct execution of the code.

Access to additional parts of the file system has to be provided by code that runs in VM0 (which is secure and fortified against unauthorized intrusion) and any increased access needs explicit authorization from the human user.

Specific trusted code that needs to interact in a complex way with other applications may be explicitly designated to run together inside the same designated VM. This type of VM also has limited access to the file system.

All code and files have limited network access to just what that code needs for its correct execution. All virtual machines are created from templates stored in VM0 which are either immutable or can be updated in a very controlled fashion. Consequently, if a security bug exists in a piece of code, the effect of the security bug is isolated ("space limited") because the compromised code has access to only a limited part of the file system, the network, devices, etc. Moreover, the effect of the security bug is "time limited" because the virtual machine that has been compromised will be subsequently discarded and a new virtual machine is created for future application instances from a clean immutable VM template.

Using Policy Data to Manage the Deployment of Virtual Machines

Embodiments allow code that originates from arbitrary external sources to be safely executed by a client. In this way, digital content of unknown trustworthiness may be safely received and potentially executed and/or interpreted by a client without incurring the risk that the digital content contains malicious code that could cause undesirable consequences.

The 'digital content' received by the client from an external source may correspond to any type of digital data, such as executable code or non-executable, interpreted data for example. Since malicious code may be carried within certain types of non-executable data and subsequently spread when the data is interpreted by applications, embodiments treat all incoming digital content as being capable of containing malicious code, even if the digital content is not in a recognized executable form. Non-limiting, illustrative examples of digital content include an ".exe" file, an application, a collection of applications designed to run together, a portion of an application, an email attachment, a slide presentation, a text document, and a web page (which essentially is a portion of an application, namely a web browser). Even though the email attachment, the slide presentation, and the text document, in and of themselves, are not executable files, embodiments of the invention treat these forms of digital content as potentially carrying malicious code.

To manage the risk posed by receiving digital content of unknown trustworthiness, any digital content received by a client is stored in one or more virtual machines. In an embodiment, digital content received from an external source may immediately be stored in one or more virtual machines upon receipt. Alternately, digital content received from an external source may be stored in an intermediate location, such as a local cache, prior to storing the digital content in a virtual machine.

While embodiments are configured to process all digital content originating from an external source in a virtual machine, the complexity of determining in which virtual machine the digital content should be stored and how that virtual machine should be configured is hidden from the user whenever possible or appropriate. To accomplish this goal, techniques are discussed herein for programmatically managing a plurality of virtual machines on the client to accommodate the wide variety of use cases for receiving digital content at a client. However, in some cases, explained in more detail below, it may be appropriate to inform the user of certain activity concerning a virtual machine, such as when obtaining express permission from the user is advisable before performing an action.

Certain sources of digital content are more trustworthy than other sources. For example, the web site of a bank or Fortune 500 company may be more trustworthy than the web site of a smaller company or lessor known organization. Also, applications may have different operating needs, e.g., certain applications may be designed to work closely with other applications or require access to network resources. Thus, in an embodiment, the attributes of each virtual machine are specifically tailored to reflect the type of digital content and/or applications operating or stored therein.

To illustrate how one embodiment operates, when a client determines that digital content, originating from an external source, is to be received or processed by the client, the client may identify, without human intervention, one or more virtual machines, executing or to be executed on the client, into which the digital content is to be received. To do so, the client may consult policy data, such as policy data 239 stored at client 200 of FIG. 2, to determine a placement policy, a containment policy, and a persistence policy used in identifying the one or more virtual machines into which the digital content is to be received.

The policy data may be used to specifically tailor the operation of each virtual machine to reflect the type of digital content and/or applications operating or stored therein. The placement policy identifies a particular virtual machine into which the digital content is to be stored, the containment policy identifies what network resources and client resources the particular virtual machine can access, and the persistence policy identifies whether data (or a part of it) stored in the particular virtual machine is persistently stored. Naturally, the placement policy, containment policy, and persistence policy are, to a certain extent, intertwined, as the resources a virtual machine may access and whether data stored therein is persisted will affect what applications/digital content are appropriate to reside therein.

In an embodiment, each of the placement policy, the containment policy, and the persistence policy may consider a variety of different factors. For example, the placement policy, the containment policy, and/or the persistence policy may consider a historical record of use for the client in identifying a virtual machine. The evaluation of a policy may involve consulting a historical record of how the client, or applications running thereon, has been used. In this way, if a particular action has been judged to be more safe (or less safe) over a period of time, the manner in which the action is handled by the policy may evolve over time. To illustrate, in an embodiment, if a particular network resource, such as an affiliate corporate web page, is demonstrated to be sufficiently safe over a period of time, then this web page may be processed using relaxed restrictions, e.g., by a web browser in a virtual machine already handling another trusted web page as opposed to instantiating a new virtual machine to handle the affiliate corporate web page. On the other hand, if the historical record of use demonstrates that an action involving a particular network resource or client resource may pose some risk to the client, then the policy may subsequently handle this action more sensitively than before, e.g., by assigning code to handle the particular network resource or client resource in a dedicated virtual machine with restricted access to client and network resources.

As another example of the types of factors which may be considered by a policy, one or more of the placement policy, the containment policy, and the persistence policy may consider a current physical location of the client or to which networks the client currently has access in identifying one or more virtual machines which should be used to receive content. In this way, which networks are available to the client, the IP address assigned to the client, the current location of the client based on global positioning service (GPS) data, and the current location of the client based on an IP address or which networks are available to the client may all be considered when determining which virtual machine should receive digital content and what restrictions should be placed on that virtual machine. In this way, when the client is physically located in an area deemed safe (such as a work office or home), digital content received by the client may be handled by a virtual machine having a set of lesser restrictions than when the client is physically located in an unknown area.

As another example of the types of factors which may be considered by a policy, one or more of the placement policy, the containment policy, and the persistence policy may consider the proximity of the client to a wireless device, such as a Bluetooth enabled cell phone. For example, if the client is not within a configurable distance to the cell phone of the user of the client, then the client may receive digital content using a set of greater restrictions, e. g., code executing in all virtual machines may be denied access to certain client resources and/or all network resources. Embodiments may determine whether the client is within a configurable distance to a wireless device using a variety of different methods, such as accessing the wireless signal strength between the client and the wireless device.

In an embodiment, at least a portion of the policy data, used in identifying one or more responsible virtual machines to receive digital content, is obtained from a remote server after the client determines that digital content is to be received from an external source. In this way, policy data may be sent, as needed, from an IT administrator to the client. The client may treat any policy data already residing on the client in the same manner as policy data retrieved from a remote server. For example, when a user of the client performs an action, the client may consult a remote server to see if the remote server has any additional policy data regarding this action. Following this procedure, an IT administrator can maintain a high level of control on how the client will manage virtual machines running on the client. This enables the IT administrator to make adjustments to the security model followed by the client in real-time. The client may interact with a human operator at a remote location to obtain additional policy data or may interact with a remote automated system, without human intervention, to obtain the additional policy data. Note that certain embodiments may be configured to consult a remote server for policy data only when a certain configurable action is taken. Therefore, in certain embodiments, the client need not always contact a remote server to determine if additional policy data is available each time that the client is to receive new digital content.

In an embodiment, the policy data may specify that the virtual machine assigned to receive digital content can only access a limited subset of the metadata properties for a client resource or a network resource. For example, a virtual machine may not be capable of determining what local wireless networks are available in the vicinity or whether the network card of the client is of a particular type. In this way, the amount and type of information exposed to a particular virtual machine may be controlled to a fine level of granularity.

Use of the placement policy, the containment policy, and the persistence policy by certain embodiments will be discussed in further detail below.

Placement Policy

The placement policy identifies a particular virtual machine into which the digital content is to be stored. The particular virtual machine identified by a placement policy in which digital content is to be stored may be an existing virtual machine or a new virtual machine that has not yet been instantiated. In the case where the placement policy specifies that the digital content should be received by a virtual machine that has not yet been instantiated, either the placement policy itself or some other location in the policy data will identify a template for use in instantiating the particular virtual machine. The identified template will describe characteristics of a virtual machine suitable for receiving the digital content.

The placement policy may weigh a variety of different considerations in determining which virtual machine should store the digital content so that the digital content may be safely executed, interpreted, and/or processed. For example, a placement policy of an embodiment may assign any file having a certain name or certain attributes to a virtual machine having certain characteristics. To illustrate, a placement policy may indicate that all signed executable files from an internal organization or company are to be assigned to a virtual machine having a specified set of characteristics. As another example, the placement policy may instruct untrusted applications to execute in separate virtual machines so that each untrusted application is isolated from other applications and data of the client.

The placement policy of an embodiment may identifies a plurality of classes of virtual machines, where each class of the plurality of classes is associated with a different trust level for external sources of digital content. Code executing in a virtual machine cannot access external sources associated with less trustworthy external sources of digital content. For example, assume there are three classes of virtual machines, where the first class of virtual machines is designed to run web browsers accessing web sites of financial institutions and email providers, the second class of virtual machines is designed to run web browsers accessing web sites of Fortune 500 companies, and the third class of virtual machines is designed to run web browsers accessing all other web sites. In this example, a web browser executing in a virtual machine that is associated with the third class cannot access any web sites from Fortune 500 companies or financial institutions and email providers. Similarly, in this example, a web browser executing in a virtual machine that is associated with the second class cannot access any web sites from financial institutions and email providers.

The placement policy of an embodiment may identify the particular virtual machine into which the digital content is to be received by observing application dependencies. Such a policy recognizes that in some instances, it is helpful or even necessary to execute certain applications within a single virtual machine. For example, certain providers of software applications may design their software applications do work together or integrate with each other to a high degree. In this case, it would be advantageous to have applications that are designed to work together to run within a single virtual machine. One way for the placement policy to make this determination would be to ask the user whether an application being installed is dependent upon another application already installed at the client to ensure that both applications may be run in the same virtual machine. While this does expose the notion of a virtual machine to the user, a user need only make a decision of this nature when an application is installed on the client, and thus, this decision may be made by IT administrators or other knowledgeable personal rather than relying upon the end user of the client to make such a decision.

Alternatively, determining whether an application being installed is dependent upon another application may be made programmatically by examining the dependencies during the installation of that application. For example, during the installation of application A, the install process may check if module B is already installed or may require that module B already by installed. In this example, the placement policy may determine then that application A has a dependency with module B and may therefore allow application A to run in same virtual machine as module B.

To illustrate another example, it is initially noted that there need not be a one to one correspondence between a web browser and a web page. For example, a web browser may comprise many tabs, and each tab may display a different web page. In addition, each web browser may have a variety of different plug-in and/or associated programs which may be treated as or considered a separate application. Since a web browser may display multiple web pages of varying trust levels, it is desirable to accommodate a web browser having multiple tabs without requiring that the web pages displayed by each tab reside in the same virtual machine. For example, if a web page contains malicious code, then it would be beneficial to execute it in a different virtual machine from the virtual machine containing the web page of your bank. Therefore, in an embodiment, the placement policy may specify that web page of certain sources should be received in a separate virtual machine. While the user may see a single web browser having two tabs, on the back end this may be implemented in two separate virtual machines that each execute a copy of the web browser and possess one web page to be shown in associated with one tab of the web browser. A practical implementation of web page placement may use a VM per web-site placement policy.

These are merely examples of how a placement policy may be implemented. It is contemplated that actual implementations of a placement policy will be configured based upon the particular needs and concerns of the end user. The containment policy of certain embodiments will now be presented in greater detail.

Containment Policy

The containment policy identifies what network resources and client resources a particular virtual machine can access. Network resources, as broadly used herein, refers to any resource that is external to the client while client resources, as broadly used herein, refers to any resources that is internal to the client. A client resource may include any device, component, and/or data residing on or accessible to the client, such as a digital camera, a network interface card, a digital clock, the current time, files, pictures, and email.

The containment policy is used to ensure that code running within a virtual machine has access to only those resources deemed necessary for normal and intended operation. For example, email attachments should not need access to the Internet (generally speaking), and so they should be opened in a virtual machine that is configured such that it does not have access to the Internet. Contain policies may be used to ensure that the resources of the client that are accessible to a virtual machine are those resources necessary to perform the activity intended to be performed within, e.g., a virtual machine instantiated to open a file may only have access to resources necessary to open, view, and edit the file.

In an embodiment, the containment policy may specify what portion of the network that is available or exposed to code executing within a virtual machine. For example, the containment policy may specify that code executing within a particular virtual machine may access no network resources, all network resources, or a subset of the network resources. Thus, a containment policy may specify that code executing within a virtual machine may access a first set of network resources and may not access a second set of network resources. Embodiments may specify what particular network resources are available to a virtual machine using any level of granularity, e.g., only certain types of network resources may be exposed, only certain properties of network resources may be exposed, or only certain portions of the network may be exposed.

In an embodiment, enterprise applications may be grouped into collections. Groupings may be based on a variety of factors, such as job functions or business unit, for example. Each grouping of applications may be executed within a single virtual machine according to an embodiment.

To illustrate the interaction between the containment policy and client resources, the containment policy of an embodiment identifies each client resource accessible to a virtual machine. For example, a containment policy may specify whether code executing in the particular virtual machine can perform one or more of the following actions: access a USB port on the client, perform a copy operation or a paste operation, access a network to which the client is connected, access a GPS device of the client, location information for the client, or tilt information for the client, access a printer or facsimile machine to which the client is connected, and access a digital camera or screen data for the client. Note that these exemplary actions are not meant to provide an exhaustive list, as a containment policy may be used to specify, with particular specificity, which client and network resources may be accessed by code executing within a virtual machine. In this way, if a new client resource becomes available, such as fingerprint scanning device, the containment policy may be updated to reflect the new client resource available to the client.

In an embodiment involving the receipt of executable code at a client, the containment policy may specify that the executable code is denied access to a user file without first obtaining a user's permission to allow the executable code to access the user file. In this way, virtual machines may be configured to allows request permission each time executable code therein access a user file, thereby allowing the user to be informed of the intentions of the executing code and presumably prevent unauthorized access to the user's own files. Such a permission scheme might be implemented naturally as part of the normal user work flow of picking a file to open by running the permission code in a clean protected VM separate from the VM running the untrusted code which is making the request.

To illustrate the interaction between the containment policy and network resources, the containment policy of an embodiment identifies whether code executing in a particular virtual machine can one or more networks accessible to the client. As another example, the containment policy of an embodiment identifies which, if any, objects stored over a network the virtual machine can access. For example, a virtual machine may be restricted to access a specified set of objects or files on a particular server or a particular set of web pages.

In an embodiment, the containment policy may consider any number of factors, including but not limited an identity of the user of the client, a set of properties of the digital content, a physical location of the client, the current time, a holiday schedule, and a set of administrator-specified policy rules. In this way, the containment policy may assign a virtual machine having more restrictions than usual to receive digital content when the digital content is deemed more likely to contain malicious code. For example, it may be deemed likely that digital content contains malicious code when it is received by the client outside of normal business hours, over a holiday, at a time when the client is outside of the user's home or work office, or when the digital content has certain suspicious properties. In this way, the containment policy may assign suspicious digital content to be received in a virtual machine having additional restrictions appropriate for such suspicious digital content.

These examples of how a containment policy may operate and merely illustrative of some examples and are not intended to be an exhaustive list, as actual implementations of a containment policy will be configured based upon the particular needs and concerns of the end user. The persistence policy of certain embodiments will now be presented in greater detail.

Persistence Policy

In an embodiment, the persistence policy identifies whether data stored in a particular virtual machine is persistently stored. The policy grapples with the issue of whether or not to save state created by untrusted code and if so, whether the state should be stored in an isolated manner or merged back into the main file system of the computer. On one hand, to provide a convenient user experience, it may be helpful to persistently store cookies for a web site. On the other hand, it would not be desirable to persistent malicious code, such as a key logger, that was inadvertently introduced into a virtual machine by malware downloaded into and run in the affected virtual machine.

The persistence policy, hand in hand with the placement policy, should be designed to ensure that any potentially malicious code is not persistently stored, or in the alternative, persistently stored in an isolated way. This way, if malicious code, such as a key logger, is persistently stored, and in any future invocation (execution or interpretation), it is invoked (executed) in the context of a possibly new virtual machine instance separate from any other code, thereby nullifying the risk presented thereby.

To illustrate an illustrative persistence policy, in an embodiment only cookies and cache files are persistently stored in a virtual machine in which a web browser executes. Further, the cookies and cache files associated with a particular web site are only inserted to a virtual machine that is intended to execute a web browser displaying that web site. Thus, cookies and a cache file associated with site A would not be inserted into a virtual machine instantiated to run a web browser to display web site B, but would be inserted into a virtual machine instantiated to run a web browser to display web site A.

The above discussion of a persistence policy is exemplary of certain embodiments and is not intended to describe all implementations of a persistence policy, as a persistence policy will be configured based upon the particular needs and concerns of the end user.

Unified Display

Even though there may be a plurality of virtual machines executing at the client, this complexity need not be exposed to the end user of the client. Thus, the end user should be presented visual content generated from each virtual machine executing on the client in a unified manner to present a single, cohesive presentation to the end user of the client. The presentation of the content should be seamless and close to native as possible.

For example, the end user of the client should interact with a web browser that looks like a known web browser, even though the web browser, at the back end, is implemented using a plurality of virtual machines to execute copies of the web browser and different web pages corresponding to each tab of the web browser.

Seamless Management of Untrusted Data Using Virtual Machines

As previously explained above, data may contain malicious code which can be used to compromise a system. Thus, computer systems of an embodiment handle data of unknown integrity with care to ensure the security and privacy of a computer. Embodiments employ approaches for identifying data which is deemed "untrustworthy." As an example, data which is retrieved by the computer system from an external network may be considered untrusted data.

Once data enters into a computer system, the data may interact with processes of the system. For example, untrusted data may interact with different types of mime-type handlers, the user, and/or a search indexer. Embodiments of the invention strive to allow the user to use the untrusted data, while still ensuring the untrusted data is as contained as possible to combat any malicious code contained therein. Containing the untrusted data would be trivial if the user was prevented from using any untrusted data; however, such an approach would frustrate the user by preventing many common use cases of the computer system. Advantageously, embodiments provide a user experience that is as native as possible to allow the user to have meaningful interaction with untrusted data, but in a safe manner that limits the exposure of client resources to the untrusted data.

When an action is requested to be performed on untrusted data, embodiments may handle the request based on the perceived intent of the user and the amount of risk presented by the requested action. Naturally, a requested action may simply be granted or denied. However, embodiments also allow for the action to be performed in a restricted manner. In such a case, the user may be completely unaware that the requested action was performed in a restricted manner, since the details on how the action was performed by the computer system were not exposed to the user.

To illustrate a concrete example, assume that a user wishes to view a text document that was retrieved over the Internet. Embodiments of the invention may consider the text document retrieved from the Internet as untrusted data. When the user clicks on a displayed icon representing the text document, the user's click causes a request to view the text document to be generated. This request may be redirected by embodiments of the invention so that the request is processed within a different virtual machine from which the request originated. The virtual machine in which this request is processed may have no access to any network, such as the Internet or any corporate network, as well as have no access to any file system. In this way, the request to view the text document may be safely processed in an environment which prevents any malicious code, embedded within the text document, from gaining access to the file system or communicating outside of the computer system. The user need not have any idea that the request to view the text document was redirected to a different virtual machine. From the user's perspective, the request to view the text document was seamlessly processed as expected.

Figure 1:
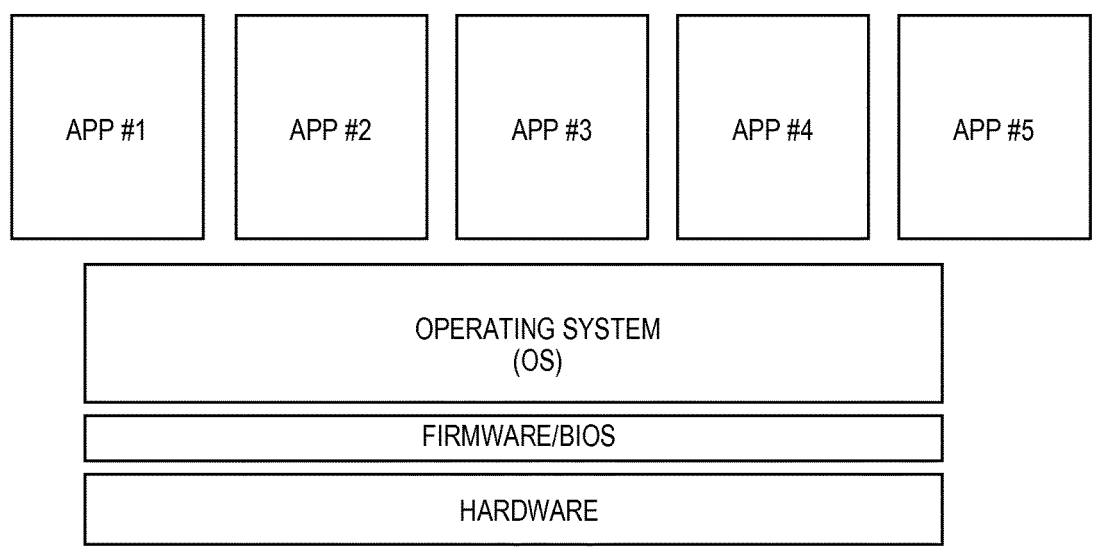
FIG. 1 is an illustration of the layered arrangement of hardware and software present in modern computer systems.
Figure 10:
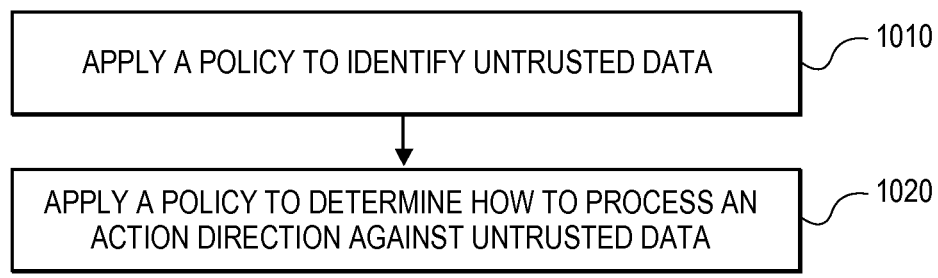
FIG. 10 is a flowchart illustrating the high level functional steps of managing untrusted data according to an embodiment of the invention.

FIG. 10 is a flowchart illustrating the high level functional steps of managing untrusted data according to an embodiment of the invention. As shown in FIG. 1, initially, in step 1010, a policy is applied to identify untrusted data. In an embodiment, step 1010 may be performed by cognitive assist module 236 applying a policy stored in policy data 239. Thereafter, in step 1020, a policy is applied to determine how to process an action directed against untrusted data. Note that any amount of time may pass between the performance of step 1010 and step 1020. Each of the steps of FIG. 10 shall be discussed below in further detail.

Untrusted Data

In step 1010, a policy is applied to identify untrusted data. In an embodiment, step 1010 may be performed by cognitive assist module 236 applying a policy stored in policy data 239. However, other embodiments may store policy data describing one or more policies for identifying untrusted data in locations other than VM0 230. Also, in other embodiments, one or more different functional components, other than cognitive assist module 236, may identify untrusted data in step 1010.

Untrusted data shall chiefly be discussed herein in terms of being embodied as files which reside on a storage medium, such as a hard-disk drive. Untrusted data, at a high level, is any data, such as a file, which has not previously been identified as being trusted. Different embodiments or implementations may define what constitutes untrusted data differently. For example, untrusted data may include any data which originates outside of a computer system or a trusted domain, such as a corporate network. Untrusted data may be introduced into a computer system a variety of different ways, such as through a DVD, a FireWire cable, a network, a USB port, to name but a few examples.

Alternately or additionally, any data that is created by a program that has been deemed untrustworthy may also be considered untrustworthy. A list of untrustworthy programs may be maintained by embodiments, and any data created by any untrustworthy program on the list will be considered untrustworthy. Similarly, a list of trustworthy programs may be maintained by embodiments, and any data created by a program not on the list of trustworthy programs may be deemed untrustworthy.

Untrusted data may be identified by virtue of the data being created in a specific location, such as a particular folder of a file directory. For example, files created within a network folder in which multiple entities (potentially unknown entities) have write access may be risky to consume, and so any file written to or saved in such a location may be deemed untrustworthy. In certain embodiments, any data that is written by a process having access to the Internet or other specific resources may be considered untrusted data. Any data that is accessed by a particular type of program may also be deemed untrusted data.

An executable file may be deemed untrustworthy based on its behavior. For example, if the executable file opens a connection to the Internet and communicates with untrusted data or an untrusted network, then the executable file or action may be deemed untrustworthy and subsequently any data written by the executable file is deemed untrusted. Thus, embodiments may maintain a list of unacceptable behavior for executable files, and if an executable file behaves in an unacceptable manner, then the executable file will be deemed untrustworthy.

In an embodiment, upon determining that an action is untrustworthy, a responsive action may be performed. To illustrate, embodiments may deny access to a file is the request is considered untrustworthy. Also, characteristics about any action deemed untrustworthy may be described in an entry that is added to an audit log to facilitate future analysis. In an embodiment, if an action is deemed untrustworthy, then an alert to an authority (such as an authentication server, cognitive assist module 236, or other such entity responsible for authentication and/or determining permission levels) may be issued to request permission to access the file.

In an embodiment, if a process reads or otherwise consumes any untrusted data, then the process itself becomes untrusted. Moreover, any data written by the untrusted process would also be deemed untrusted data. To illustrate a concrete example, assume that a particular ".docx" file is deemed untrustworthy. In an embodiment, if an instance of Microsoft Word is used to open the untrustworthy ".docx" file, then the instance of Microsoft Word, as well as any documents written by the instance, will be deemed untrustworthy.

Any data that would otherwise be considered untrusted may be considered trustworthy if the data is signed by an appropriate authority, such as an IT administrator or the like.

The approaches described above may be combined in any manner and in an arbitrarily complex fashion. Thus, embodiments may employ any number of approaches for identifying untrusted data. Certain embodiments may employ policies that consider one or more factors in identifying untrusted data, and each factor in such a policy may be, but need not be, given a different weight.

Ensuring Untrusted Data is Properly Identified

In certain embodiments, data identified as untrusted data in step 1010 may be associated with a record (hereinafter an "untrustworthy record") to label the data as untrusted data. This label may be used to ensure that the data remains identifiable as untrusted, regardless of whether the untrusted data is renamed, copied, compressed, uncompressed, decomposed into smaller portions, comprised within a larger entity, etc.

For example, assume that a zip file is deemed untrustworthy. Embodiments of the invention may associate an untrustworthy record with the zip file. If the untrusted zip file is unzipped, then the contents of the zip file should also be deemed untrustworthy. Therefore, the uncompressed contents of the zip file will also be associated with an untrustworthy record. Similarly, renaming the untrusted zip file would not disassociate the untrustworthy record from the untrusted zip file.

As untrusted data may contain potentially malicious code, any process which consumes untrusted data subsequently should be considered untrusted as well, since it may have been corrupted. Thus, embodiments of the invention follow a "transitive law of untrustworthiness" by assuming that any process that reads, consumes, or uses untrusted data becomes itself untrusted. The untrusted process would then be associated with an untrustworthy record. Moreover, any data written by an untrusted process is considered to be untrusted data, and thus, would be associated with an untrustworthy record.

To illustrate an example of this, assume that a text document has been deemed untrustworthy and thus, is associated with an untrustworthy record. If an instance of a Microsoft Word application reads the untrustworthy text document, then an embodiment will associate that instance of the Microsoft Word application with an untrustworthy record to identify that instance as being untrustworthy. If the untrusted instance of the Microsoft Word application subsequently saves another document, then that new document would be considered an untrusted file and be associated with an untrustworthy record.

In an embodiment, each untrustworthy record may contain metadata about the circumstances which lead the associated data to being labeled untrustworthy. For example, an untrustworthy record may identify how the data entered into the computer system. In this way, embodiments of the invention may examine untrustworthy records to extract certain metadata that may be used in determining how to handle the untrusted data. For example, embodiments of the invention described below may employ policies which handle untrusted data different based on how the untrusted data entered the computer system. In this way, untrusted data that enters into a computer system via a perceived lower risk route (such as via a CD or DVD) may be handled in a different manner than untrusted data that enters into the computer system via a perceived higher risk route (such as via the Internet).

As a result of maintaining untrustworthy records for a set of files in a file system, the file system essentially contains two classes of files, namely trusted files (i.e., those files which lack an associated untrustworthy record) and untrusted files (i.e., those files having an associated untrustworthy record).

Performing Requested Actions on Untrusted Data

In step 1020 of FIG. 10, a policy is applied to determine how to process an action directed against untrusted data or requested by an untrusted entity. In an embodiment, step 1020 may be performed by cognitive assist module 236 applying a policy stored in policy data 239. However, other embodiments may store policy data describing one or more policies for determine how to process an action directed against untrusted data in locations other than VM0 230. Also, in other embodiments, one or more different functional components, other than cognitive assist module 236, may determine how to process an action directed against untrusted data or involving an untrusted requestor in step 1020.

In an embodiment, whenever an action is performed is requested to be performed against untrusted data or involving an untrusted requestor, the request is communicated to cognitive assist module 236 so that cognitive assist module 236 may apply a policy to determine whether the request should be granted with full access, denied (which may be embodied as a permission error or an encryption error), or granted with limited access. The policy may consider any number of factors, such as factors concerning the identity of the entity requesting the performance of the action, the manner in which the requesting entity gaining access to the untrusted data, and/or the nature of the requested action.

As a result of applying the policy in step 1020, if the request to perform the action is not granted with full access or denied, then it may be granted with limited access. One example of limited access which may be granted is that the requesting entity may be given read access to a portion, but not all, of the untrusted data. For example, the requesting entity may be given read access to only the header of a file but not the complete file itself or may be given read access to a specified number of bytes or blocks of the file.

Another example of granting the request with limited access is allowing the requested action to be performed on the untrusted data, but the action is performed within a different virtual machine from which the request arose. The different virtual machine in which the action is performed may be a pre-existing virtual machine (i.e., a virtual machine that is already instantiated) or a virtual machine that will be instantiated for purposes of performing the action.

To illustrate a concrete example with reference to FIG. 2, assume that a request to perform open an untrusted text document was issued in LVM 240. This request may be redirected to cognitive assist module 236. The request may be denied to be performed within LVM 240 by cognitive assist module 236, but cognitive assist module 236 may seamlessly migrate the performance of the request to UCVM 266. Thus, the read operation on the untrusted text document will fail in LVM 240, but will be performed in UCVM 266 in a manner transparent to the user. UCVM 266 may be configured such that the request may be performed safely therein, e.g., UCVM 266 may have no access to a network or to file system 242. From the user's perspective, the user was able to do what the user wanted to do (i.e., read the text document), but from a system perspective, the untrusted text document was read in the proper virtual machine to protect the resources of the system.

Migrating the performance of an action directed against untrusted data to a virtual machine that is configured to contain any risk presented by the untrusted data advantageously allows the user to use the untrusted data without sacrificing the security of the computer system. For example, if an audio file, such as an ".MP3" file, is untrusted, then the user doesn't care which virtual machine plays the audio file, the user just simply wants to listen to the audio file. By migrating the playing of the untrusted audio file to a virtual machine having no exposure to system resources, the user may listen to the audio file without allowing any malicious code contained therein the opportunity to affect any lasting change in the system.

Certain types of request may be considered as involving untrusted data by virtue of the type of request. Thus, certain types of requests, such as a shell open command, may be considered as untrusted even if the request does not specify any data. The rationale behind such a policy is that certain types of requests can be used to cause mischief, and therefore, should be performed in a manner to prevent unnecessary exposure of system resources. To illustrate a concrete example with reference to FIG. 2, assume that a request to perform a shell open command was issued in VM0 230. This request may be redirected to cognitive assist module 236. The request may be denied, but seamlessly migrated to UCVM 264 for processing. UCVM 264 may be configured such that the request may be performed safely therein, e.g., UCVM 264 may have no access to a network or to file system 242. Thus, the shell open command will fail in VM0 230 but will be performed in UCVM 264 in a manner transparent to the user. From the user's perspective, the user was able to do what the user wanted to do, but from a system perspective, the shell open command was performed in the proper virtual machine to protect the resources of the system.

The policy itself used by cognitive assist module 236 in making this determination may be relatively straightforward or arbitrarily complex. For example, the policy may be based, at least in part, upon metadata contained within the untrustworthy records associated with the untrusted data and may consider any number of factors.

In an embodiment, the policy applied in step 1020 may consider whether the entity requesting the performance of the action on the untrusted data intends to interpret the untrusted data. In general, a certain level of limited scope of interpretation may not pose an unacceptable level of risk. For example, it may be permissible to allow certain applications to read the header of untrusted file if the application is not going to read the untrusted file in its entirety. Processes that interpret a file in its entirety present more of a security concern, while processes that consider a file as opaque data present less of a concern. Thus, certain embodiments may, in performing step 1020, prevent processes that interpret data from performing the requested action on untrusted data, but allow processes that do not interpret data to perform the requested action on untrusted data.

One approach for determining whether an application or process will be interpreting untrusted data is to examine the identity of the requesting application or process. Some applications or processes are known to treat files in an opaque manner, such as when a process that makes a backup of a file. Such applications or processes may be identified in a white list comprised within policy data 239.

Also, certain mime-types may be deemed to be safe, such as a calendar file. Such mime-types which pose little to no risk may also be identified on a white list.

Alternately, some applications or processes are known to interpret files, e.g., an application responsible for rendering a text document or digital image must interpret the file to render it properly. Applications or processes that are known to interpret data may be identified in a black list comprised within policy data 239. In this way, a white list or a black list may be consulted in step 1020 in determining how to process the requested action. Thus, in a certain embodiments, a white list may be consulted in step 1020 to allow certain programs/files to execute, while denying all others. Also, certain files or programs may be flagged so that any action performed by or on them are performed in a separate virtual machine, such as a UCVM or LVM, having characteristics designed to address the security concerns posed thereby.

Another approach for determining whether an application or process will be interpreting the untrusted data is to determine whether the requesting entity is a registered mime-type handler for the untrusted data. If an application or process is the registered mime-type handler for the mime-type of a file, then it is very likely that the application or process will interpret the file. Conversely, if an application or process is not the registered mime-type handler for the mime-type of a file, then it is very likely that the application or process will not interpret the file and treat the file as opaque data.

As an illustration of this principle, consider the application Outlook, a popular email application, available from Microsoft Corporation. Outlook is not the registered mime-type handler of the ".zip" mime-type. Therefore, if a user attempts to attach a compressed file having a mime-type of ".zip" to an email in Outlook, the Outlook application will not attempt to interpret the ".zip" file, but instead will treat the compressed ".zip" file as a stream of bytes and simply attach the compressed file to the email without interpreting the file. In this example, since Outlook will not be interpreting a compressed ".zip" file by attaching it to an email, if a user instructs Outlook to do so, then the policy applied in step 1020 may permit such an action in recognition that the action poses an acceptable level of risk.

Certain mime-types are handled by the operating system itself, such as executable files. There is a concern in allowing such executable files to execute unchecked given their potential to affect change and potential carry malicious code. In an embodiment, if the user requests the execution of a file that is deemed untrustworthy, then the user may be notified that the action, and by extension the file, is untrustworthy. For example, a dialogue box may be displayed to the user indicated that the file the user just clicked on is an untrusted file. Alternatively, information about a file being untrusted may be displayed prior to the user clicking on the file to initiate execution of the file, such as by displaying such information to the user when the user does a move over operation over the icon for the file or right clicks on the icon for the file.

The user may be presented with an option to execute the file in an untrusted manner. If the user selects the option to execute the untrusted file, the untrusted file may be executed within a particular virtual machine, such as a UCVM, specifically tailored to prevent to contain the untrusted file. For example, the UCVM in which the untrusted file executed may not have any exposure to a network or a file system. For the same reason, the UCVM in which the untrusted file is executed may only exist during the execution of the file. When the file is done executing, the UCVM may be de-instantiated. As the UCVM exists only as long as necessary to run the program, no data need be persisted as a result of executing the file. On the other hand, if persisting changes made by an executable file is desirable by an IT administrator, this may be accomplished by determining the changes made to UCVM as a result of the execution of the program and subsequently storing those changes so the changes may be injected into another virtual machine at a later date.

In an embodiment, the policy applied in step 1020 may consider how the requesting entity accessed the file. Files may be access from different API levels. Such differing API levels include, in decreasing proximity to the user, an Explorer Shell Interface API level, a Win32 API level, and a Kernel API level. In other words, a user is more likely to initiate an action that utilizes the Explorer Shell Interface API level. The Explorer Shell Interface API may in turn make calls into the Win32 API level, and so on. Thus, an action initiated by the user is more likely to access a file via the Explorer Shell Interface API than the Kernel API, whereas a malicious executable file is more likely to utilize the Win32 API to discover and interact with files rather than the Explorer Shell Interface API.

In an embodiment, an action initiated by a user is, when at all possible, attempted to be performed to provide the user with a user experience that behaves as expected and is close to native as possible. However, an action that is not initiated by a user is not afforded the same deference because such an action is more likely to be the result of malicious code that has been inadvertently introduced into the computer system.

To illustrate an example, imagine a malicious program that traverses all the files in a file system on the client, reads the files, and extracts text from them. To prevent this hypothetical malicious program and other such programs from succeeding, embodiments of the invention prevents such programs operating without benefit of either (a) being initiated by the user or (b) being identified on a white list from discovering the presence of files in the computer system. In this way, this hypothetical malicious program would be prevented from learning about any files stored on the disk.

Similarly, certain embodiments, in performing step 1020, may deny the existence of a file to a program if the program is accessing the file through an API level that raises some concern. For example, at the file system level, embodiments may prevent certain kinds of access that are not the intended use case, such as an action against a file that does not originate from the Explorer Shell Interface API. Such an approach would prevent an indexing or backup program from stumbling across a file for mischievous purposes. As a result, in an embodiment, if the action requested to be performed in step 1020 is not user initiated or is accessed from a API layer that is prohibited, then the action is deemed untrustworthy and the entity requesting the performance of the action on the file is informed the file does not exist (even if the file does exist).

Note that the policy consulted in step 1020 may be, but need not be, the same policy which was consulted in step 1010. In other words, an embodiment may store (a) a first set of policy data that describes one or more policies for identifying untrusted data or an untrusted action and (b) a second set of policy data that describes how to process an action involving untrusted data or an untrusted action.

In an embodiment, all files, or any portion thereof, in a file system that are deemed untrustworthy may be stored in an encrypted fashion. Thus, any program that attempts to open an untrusted file (for example, by scanning the file system) would be unable to read the untrusted file, thereby rendering the program safe from any malicious code contained within the untrusted file.

Embodiments of the invention may provide mechanisms to safely perform any operation against an untrusted file (such as opening or editing the file) by only permitting the operation to occur within a virtual machine, such as a UCVM. The encryption key(s) to encrypt and decrypt untrusted files may be managed using a variety of different approaches. To illustrate, such key(s) may be implemented as an enterprise wide PKI system for untrusted files (or classes of untrusted files) in an organization or such key(s) may be system local only. Any of the files deemed to be untrustworthy may be prevented from being decrypted unless the files are decrypted within a virtual machine instantiated for that purpose.

Certain embodiments may also make the un-encrypted data of a particular file type available to certain programs which are known to not interpret the contents of the particular file type. For example, embodiments may allow an email client, such as Microsoft Outlook, to read a raw untrusted file (decrypted) in response to a user directed "attach file" operation while composing an email. This operation may be permitted by an embodiment because Microsoft Outlook is not registered as a MIME handler for the file type in questions, and will never try to interpret the contents of the file being attached, but would simply blindly communicate the attached file further to the mail server.

Creating a Distinct Name Space Entity

In an embodiment, in the performance of step 1020, if cognitive assist module 236 permits an action to be performed on the file, cognitive assist module 236 may create (if not already created) a separate and distinct name space entity for the file so that the names space entity for file is separate from the file itself. The name space entity may be embodied as a link file that references the original file. The purpose of creating the separate name space entity for the file is so that when the original file is detected by a program, the program still does not have access to the file without traversing the link provided by the name space entity.

The name space entities described above serve as proxies for the original files while preserving the user's ability to interact with the real untrusted files (the real untrusted files may be managed by embodiments of the invention). The proxy name space entities appear visually just as the original real untrusted files would have appeared, with the same icons and similar set of supported user operations. For example, performing a right click mouse operation on a proxy file may cause the display of the same menu as performing the same operation on the real untrusted file represented by the proxy file.

Ensuring User Experience as Close to Native as Possible

Certain embodiments support a graphical user interface that looks and behaves as close as possible to the graphical user interface provided by operating system 232. For example, all icons of files rendered on display 912 may look like the typical icon for that file type. Further, when a user double-clicks on an icon, the resulting action should be the same as expected, e.g., an application should be launched or a file displayed.

Embodiments may be designed to implement a comparable view from the shell. For example, if a user opens a file using the ninth associated mime-handler, then a compatible view from the shell should still be supported.

Untrusted files may be rendered by embodiments to appear as native files or trusted files to users so users may perform normal file operations on untrusted files without compromising security. Such normal file operations include, without limitation, rename operations, delete operations, copy operations, drag-and-drop operations, and attribute change operations. Security need not be compromised because such normal file operations may be performed on an untrusted file in a VM, such as a UCVM, in a manner transparently to the user.

Processing Requested Actions on Secret Data

In certain embodiments, data may be associated with a record (hereinafter a "secret record") to label the data as secret data. For example, certain sensitive corporate data, such as a set of files, may each be labeled with a secret record. The purpose of the secret record is to inform cognitive assist module 236 that any operation performed on the file should confirm to policies identified in policy data 239. In this way, a corporation may define policies that restrict what actions may be performed on their secret data. For example, a file that is associated with a secret record may be prevented by cognitive assist module 236 from being printed, attached to an email, or otherwise communicated outside of client 200.

Hardware Mechanisms

Figure 9:
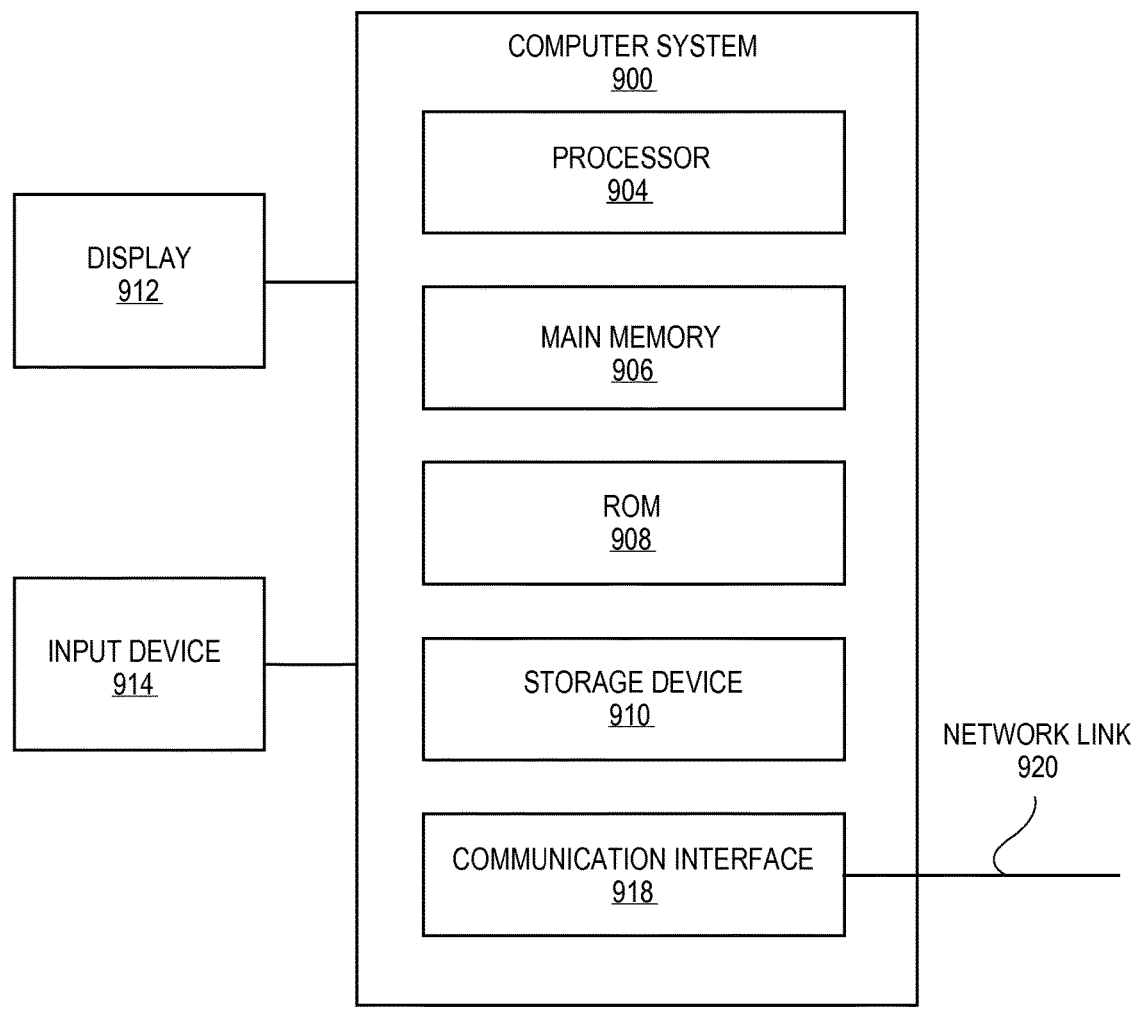
FIG. 9 is a block diagram that illustrates a computer system upon which an embodiment of the invention may be implemented.

In an embodiment, client 200 of FIG. 2 may be implemented on, include, or correspond to a computer system. FIG. 9 is a block diagram that illustrates a computer system 900 upon which an embodiment of the invention may be implemented. In an embodiment, computer system 900 includes processor 904, main memory 906, ROM 908, storage device 910, and communication interface 918. Computer system 900 includes at least one processor 904 for processing information. Computer system 900 also includes a main memory 906, such as a random access memory (RAM) or other dynamic storage device, for storing information and instructions to be executed by processor 904. Main memory 906 also may be used for storing temporary variables or other intermediate information during execution of instructions to be executed by processor 904. Computer system 900 further includes a read only memory (ROM) 908 or other static storage device for storing static information and instructions for processor 904. A storage device 910, such as a magnetic disk or optical disk, is provided for storing information and instructions.

Computer system 900 may be coupled to a display 912, such as a cathode ray tube (CRT), a LCD monitor, a television set, and the like, for displaying information to a user. In an embodiment, display 912 may include a virtual display that is being rendered on a physical display. The virtual display may be rendered using a variety of protocols, such as a remote desktop protocol (RDP). An input device 914, including alphanumeric and other keys, is coupled to computer system 900 for communicating information and command selections to processor 904. Other non-limiting, illustrative examples of input device 914 include a mouse, a trackball, or cursor direction keys for communicating direction information and command selections to processor 904 and for controlling cursor movement on display 912. While only one input device 914 is depicted in FIG. 9, embodiments of the invention may include any number of input devices 914 coupled to computer system 900.

Embodiments of the invention are related to the use of computer system 900 for implementing the techniques described herein. According to one embodiment of the invention, those techniques are performed by computer system 900 in response to processor 904 executing one or more sequences of one or more instructions contained in main memory 906. Such instructions may be read into main memory 906 from another machine-readable medium, such as storage device 910. Execution of the sequences of instructions contained in main memory 906 causes processor 904 to perform the process steps described herein. In alternative embodiments, hard-wired circuitry may be used in place of or in combination with software instructions to implement embodiments of the invention. Thus, embodiments of the invention are not limited to any specific combination of hardware circuitry and software.

The term "machine-readable storage medium" as used herein refers to any tangible medium that participates in storing instructions which may be provided to processor 904 for execution. Such a medium may take many forms, including but not limited to, non-volatile media and volatile media. Non-volatile media includes, for example, optical or magnetic disks, such as storage device 910. Volatile media includes dynamic memory, such as main memory 906.

Non-limiting, illustrative examples of machine-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or cartridge, or any other medium from which a computer can read.

Various forms of machine readable media may be involved in carrying one or more sequences of one or more instructions to processor 904 for execution. For example, the instructions may initially be carried on a magnetic disk of a remote computer. The remote computer can load the instructions into its dynamic memory and send the instructions over a network link 920 to computer system 900.

Communication interface 918 provides a two-way data communication coupling to a network link 920 that is connected to a local network. For example, communication interface 918 may be an integrated services digital network (ISDN) card or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through a local network to a host computer or to data equipment operated by an Internet Service Provider (ISP).

Computer system 900 can send messages and receive data, including program code, through the network(s), network link 920 and communication interface 918. For example, a server might transmit a requested code for an application program through the Internet, a local ISP, a local network, subsequently to communication interface 918. The received code may be executed by processor 904 as it is received, and/or stored in storage device 910, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. One or more non-transitory computer-readable storage mediums storing one or more sequences of instructions for managing potentially malicious files using isolated environments, which when executed by one or more processors, cause:

in response to receiving a request to perform an action on a file, a client applying a policy to determine whether the action is deemed trustworthy; and the client instantiating, without human intervention and based on the policy, an isolated environment in which the action is to be performed against the file, wherein the policy determines which resources of the client, other than the file or a resource required to provide access to the file, are accessible to the isolated environment, upon instantiation of the isolated environment, based on the request to perform an action on the file.

2. The one or more non-transitory computer-readable storage mediums of claim 1, wherein execution of the one or more sequences of instructions further cause:

upon determining that the action is deemed untrustworthy, performing a responsive action, wherein the responsive action includes one or more of: disallowing access to the file, adding an entry describing characteristics of the untrustworthy action to an audit log to facilitate future analysis, and issuing an alert to an authority to request permission to access the file.

3. The one or more non-transitory computer-readable storage mediums of claim 1, wherein the policy indicates that if the file originates from an untrusted domain, then the action is deemed untrustworthy.

4. The one or more non-transitory computer-readable storage mediums of claim 1, wherein the policy indicates that if the action is to be performed by a mime-type handler associated with the file, then the action is deemed untrustworthy.

5. The one or more non-transitory computer-readable storage mediums of claim 1, wherein the policy indicates that if the action involves a process that previously interpreted an untrustworthy file, then the action is deemed untrustworthy.

6. The one or more non-transitory computer-readable storage mediums of claim 1, wherein the policy indicates that if the action involves an entirety of the file being interpreted, then the action is deemed untrustworthy.

7. The one or more non-transitory computer-readable storage mediums of claim 1, wherein execution of the one or more sequences of instructions further causes:
upon determining that the action is deemed untrustworthy, storing data indicating that the file is untrustworthy.

8. The one or more non-transitory computer-readable storage mediums of claim 1, wherein execution of the one or more sequences of instructions further causes:
detecting, without human intervention, an attempt to interpret the contents of the file.

9. The one or more non-transitory computer-readable storage mediums of claim 1, wherein the policy indicates that if the action involves a portion of the file being interpreted, then the action is deemed trustworthy.

10. The one or more non-transitory computer-readable storage mediums of claim 9, wherein the portion is a header of the file, a specified portion of the total number of bytes of the file, or a specified portion of the total number of blocks of the file.

11. The one or more non-transitory computer-readable storage mediums of claim 1, wherein the isolated environment is a first isolated environment, wherein the action originated in a second isolated environment, and wherein the policy specifies that the action is to be performed in a different isolated environment other than the second isolated environment.

12. The one or more non-transitory computer-readable storage mediums of claim 11, wherein a user is informed by the client that the action is performed but not informed by the client that the action is performed in a different isolated environment than the first isolated environment or the second isolated environment.

13. The one or more non-transitory computer-readable storage mediums of claim 1, wherein execution of the one or more sequences of instructions further causes:
upon determining that the action is deemed untrustworthy, storing data indicating that a process associated with the action is untrustworthy.

14. The one or more non-transitory computer-readable storage mediums of claim 1, wherein the policy indicates that if the action involves a process that has communicated with untrusted data or an untrusted network over the Internet, then the action is deemed untrustworthy.

15. The one or more non-transitory computer-readable storage mediums of claim 1, wherein the policy indicates that if the file is located in a particular location, then the file or action is deemed untrustworthy.

16. The one or more non-transitory computer-readable storage mediums of claim 1, wherein the policy specifies that actions initiated by a user are deemed trustworthy, and wherein the policy specifies that actions not associated with user-initiated action are deemed untrustworthy.

17. The one or more non-transitory computer-readable storage mediums of claim 1, wherein the policy specifies that if the file is created by a process in a set of identified processes, then the action is deemed untrustworthy.

18. The one or more non-transitory computer-readable storage mediums of claim 1, wherein the policy specifies that if the file is created by a process in a set of identified processes, then the action is deemed trustworthy.

19. The one or more non-transitory computer-readable storage mediums of claim 1, wherein the policy specifies a preferred API level to interact with the file, and wherein if the action arises from any API level other than the preferred API level, then the action is deemed untrustworthy.

20. The one or more non-transitory computer-readable storage mediums of claim 19, wherein the preferred API level is one of a number of API levels comprising an Explorer Shell Interface API level, a Win32 API level API, and a Kernel API level.

21. The one or more non-transitory computer-readable storage mediums of claim 1, wherein execution of the one or more sequences of instructions further causes:
providing notification, to a user, that the action is deemed untrustworthy; and
in response to receiving user input which indicates that the untrustworthy action is to be performed in the same isolated environment in which the action arose, performing said action against said file in said virtual machine.

22. The one or more non-transitory computer-readable storage mediums of claim 1, wherein execution of the one or more sequences of instructions further causes:
the client denying the performance of the action upon determining that the policy indicates that the file is a member of a protected set of files and the action is a member of a prohibited set of actions.

23. The one or more non-transitory computer-readable storage mediums of claim 1, wherein said policy is a first policy, and wherein execution of the one or more sequences of instructions further causes:
in response to determining that the file or action is deemed untrustworthy using a second policy, consulting a third policy to identify a responsive action to perform.

24. The one or more non-transitory computer-readable storage mediums of claim 1, wherein execution of the one or more sequences of instructions further causes:
creating a name space entity for the file that is separate from the file; and
in response to receiving an access request for the file through a particular API level, processing the access request by providing the name space entity to the requestor rather than the file.

25. The one or more non-transitory computer-readable storage mediums of claim 1, wherein execution of the one or more sequences of instructions further causes:
upon deeming the file untrustworthy, rendering the file deemed to be untrustworthy as a native file; and permitting a normal file operation to be performed on the file deemed to be untrustworthy, wherein the normal file operation is performed in the isolated environment.

26. The one or more non-transitory computer-readable storage mediums of claim 1, wherein the action comprises encrypting the file after the file has been deemed untrustworthy, and wherein execution of the one or more sequences of instructions further causes:

preventing the file deemed to be untrustworthy from being decrypted unless the file is decrypted within a particular isolated environment instantiated for that purpose.

27. The one or more non-transitory computer-readable storage mediums of claim 1, wherein the resources of the client that are accessible to the isolated environment are those resources necessary to view or edit the file.

28. The one or more non-transitory computer-readable storage mediums of claim 1, wherein the instantiation of the isolated environment does not require booting of the isolated environment.

29. The one or more non-transitory computer-readable storage mediums of claim 1, wherein said file is in a set of files deemed untrustworthy, and wherein each file in said set of files deemed untrustworthy is opened in a separate isolated environment based on said policy.

30. A client, comprising:

one or more processors;

one or more non-transitory storage mediums storing one or more sequences of instructions for managing potentially malicious files using isolated environments, which when executed by the one or more processors, causes:

in response to receiving a request to perform an action on a file, a client applying a policy to determine whether the action is deemed trustworthy; and the client instantiating, without human intervention and based on the policy, an isolated environment in which the action is to be performed against the file, wherein the policy determines which resources of the client, other than the file or a resource required to provide access to the file, are accessible to the isolated environment, upon instantiation of the isolated environment, based on the request to perform an action on the file.

31. A method for managing potentially malicious files using isolated environments, comprising:

in response to receiving a request to perform an action on a file, a client applying a policy to determine whether the action is deemed trustworthy; and the client instantiating, without human intervention and based on the policy, an isolated environment in which the action is to be performed against the file, wherein the policy determines which resources of the client, other than the file or a resource required to provide access to the file, are accessible to the isolated environment, upon instantiation of the isolated environment, based on the request to perform an action on the file.

* * * * *